United States Patent
Haustein et al.

(10) Patent No.: US 11,160,138 B2
(45) Date of Patent: Oct. 26, 2021

(54) MULTI-CONNECTIVITY USER DEVICE FOR WIRELESS COMMUNICATION NETWORKS

(71) Applicant: Fraunhofer-Gesellschaft zur Förderung der angewandten Forschung e.V., Munich (DE)

(72) Inventors: Thomas Haustein, Berlin (DE); Thomas Wirth, Berlin (DE); Lars Thiele, Berlin (DE); Martin Kurras, Berlin (DE); Marcus Grossmann, Berlin (DE); Marco Breiling, Berlin (DE); Junyoung Nam, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 16/809,303

(22) Filed: Mar. 4, 2020

(65) Prior Publication Data
US 2020/0205230 A1 Jun. 25, 2020

Related U.S. Application Data

(63) Continuation of application No. PCT/EP2018/073623, filed on Sep. 3, 2018.

(30) Foreign Application Priority Data

Sep. 6, 2017 (EP) .................. 17189714

(51) Int. Cl.
*H04W 4/44* (2018.01)
*H04W 88/06* (2009.01)
(Continued)

(52) U.S. Cl.
CPC .......... *H04W 88/06* (2013.01); *H04B 7/0617* (2013.01); *H04B 7/0697* (2013.01);
(Continued)

(58) Field of Classification Search
CPC ....... H04W 88/06; H04W 4/44; H04W 16/14; H04W 24/02; H04W 36/14;
(Continued)

(56) References Cited

U.S. PATENT DOCUMENTS 7,379,750 B2 * 5/2008 Jalali ................. H04W 36/0069
455/550.1
8,989,291 B2 * 3/2015 Haustein .............. H04B 7/0617
375/267

(Continued)

FOREIGN PATENT DOCUMENTS

DE         2546099 A1    4/1977
JP       2015527774 A    9/2015
(Continued)

OTHER PUBLICATIONS

WWRF Working Group C, Communication Architectures and Technologies, White Paper, "LTE Small Cell Enhancement by Dual Connectivity", 2014., 2014.
(Continued)

*Primary Examiner* — Julio R Perez
(74) *Attorney, Agent, or Firm* — Michael A. Glenn; Perkins Coie LLP

(57) ABSTRACT

A user device UE for a wireless communication with a plurality of wireless network elements includes a plurality of antennas. The plurality of antennas are configured to form a plurality of spatial or directional beams. The user device is configured to provide simultaneously a plurality of independent wireless communication links using the plurality of spatial or directional beams, wherein the user device is configured to provide a first wireless communication link with a first wireless network element using a first spatial or (Continued)

directional beam and to provide a second wireless communication link with a second wireless network element using a second antenna beam.

49 Claims, 10 Drawing Sheets

(51) Int. Cl.
| | |
|---|---|
| *H04B 7/06* | (2006.01) |
| *H04W 16/14* | (2009.01) |
| *H04W 24/02* | (2009.01) |
| *H04W 36/14* | (2009.01) |
| *H04W 72/12* | (2009.01) |

(52) U.S. Cl.
CPC .............. *H04W 4/44* (2018.02); *H04W 16/14* (2013.01); *H04W 24/02* (2013.01); *H04W 36/14* (2013.01); *H04W 72/1215* (2013.01)

(58) Field of Classification Search
CPC . H04W 72/1215; H04W 84/12; H04W 88/02; H04B 7/0617; H04B 7/0697
See application file for complete search history.

(56) References Cited

U.S. PATENT DOCUMENTS

| | | | | |
|---|---|---|---|---|
| 9,479,233 | B2* | 10/2016 | Maltsev | H04B 7/0669 |
| 9,961,564 | B2* | 5/2018 | Oh | H04W 88/10 |
| 10,103,428 | B2* | 10/2018 | Ozaki | H01Q 25/00 |
| 10,141,999 | B2* | 11/2018 | Furuskog | H04B 7/0617 |
| 10,425,901 | B2* | 9/2019 | Islam | H04W 74/0833 |
| 10,587,499 | B2* | 3/2020 | Gomadam | H04B 7/0695 |
| 10,666,346 | B2* | 5/2020 | Bergstrom | H04B 7/0617 |
| 10,667,149 | B2* | 5/2020 | Uchino | H04W 24/10 |
| 2013/0223329 | A1 | 8/2013 | Jain et al. | |
| 2013/0329639 | A1 | 12/2013 | Wietfeldt et al. | |
| 2014/0206414 | A1 | 7/2014 | Oh et al. | |
| 2015/0020157 | A1 | 1/2015 | Kim et al. | |
| 2015/0257073 | A1 | 9/2015 | Park et al. | |
| 2016/0277911 | A1 | 9/2016 | Kang et al. | |

FOREIGN PATENT DOCUMENTS

| | | |
|---|---|---|
| JP | 2016530766 A | 9/2016 |
| KR | 20150105710 A | 9/2015 |
| KR | 101656808 B1 | 9/2016 |
| WO | 2014172306 A2 | 10/2014 |
| WO | 2016152655 A1 | 9/2016 |

OTHER PUBLICATIONS

3GPP TS 38211 V0.0.0 (May 2017), 3rd Generation Partnership Project; Technical Specification Group Radio Access Network; NR; Physical channels and modulation (Release 15), 2017.

Intel Corporation, "Beam support in NR", vol. RAN WG2, No. Dubrovnik, Croatia; Apr. 11-15, 2016, (Apr. 2, 2016), 3GPP Draft; R2-162709, Retrieved from the Internet: URL:http://www.3gpp.org/ftp/tsg_ran/WG2_RL2/TSGR2_93bis/Docs/, XP051082507, Apr. 2016.

Qualcomm Incorporated, "On multi-TRP and multi-panel transmission", 3GPP TSG RAN WG1 #90, Aug. 21-25, 2017, Prague, Czech, R1-1713391, Aug. 2017.

InterDigital Communications, On Power Control Processes for Multi Beam Transmission in NR[online], 3GPP TSG RAN WG1#88bR1-1705515, Internet<URL:http://www.3gpp.org/ftp/tsg_ran/WG1_RL1/TSGR1_88b/Docs/R1-1705515.zip>, Mar. 25, 2017, pp. 1-4.

\* cited by examiner

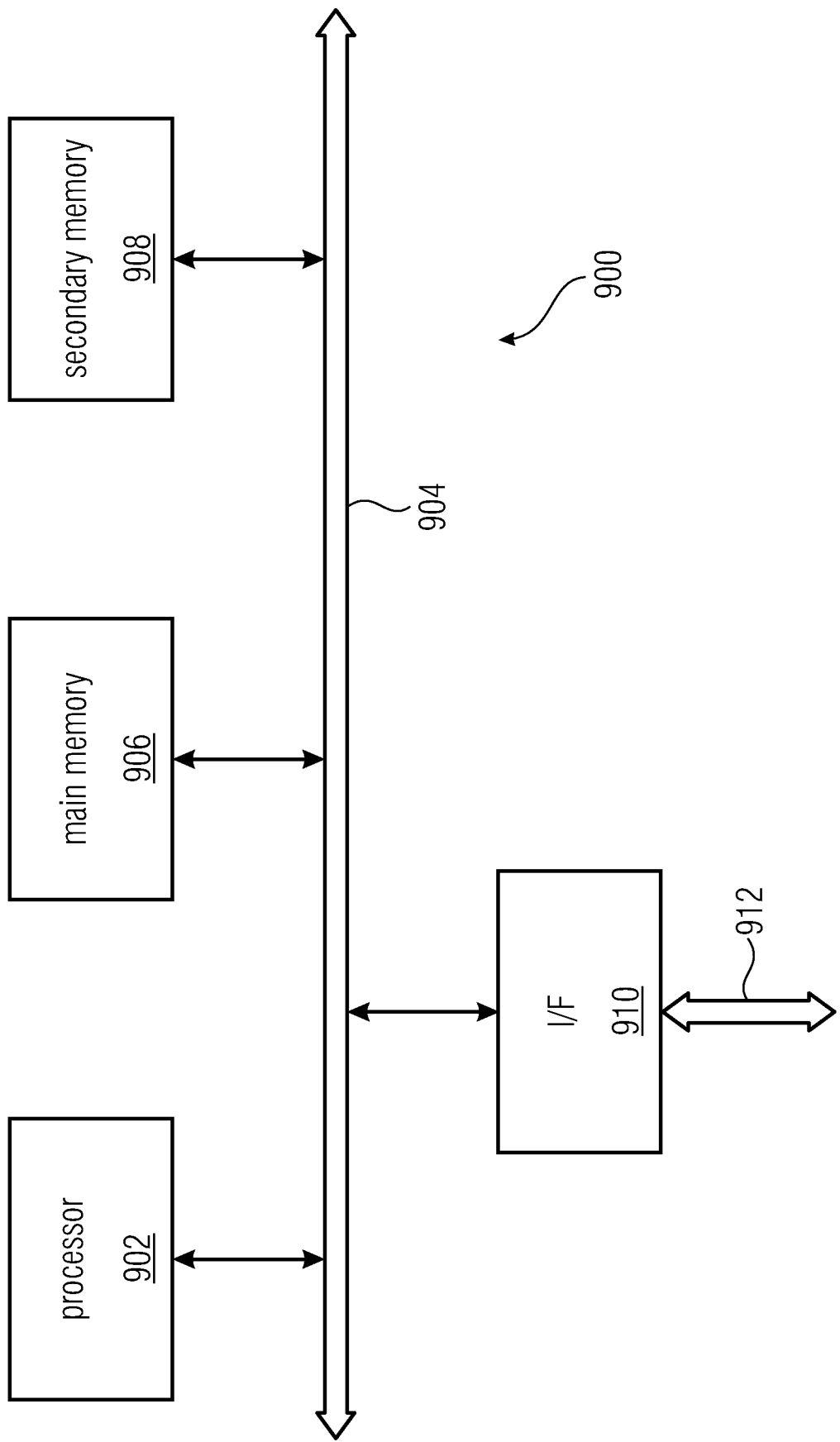

MULTI-CONNECTIVITY USER DEVICE FOR WIRELESS COMMUNICATION NETWORKS

CROSS-REFERENCES TO RELATED APPLICATIONS

This application is a continuation of copending International Application No. PCT/EP2018/073623, filed Sep. 3, 2018, which is incorporated herein by reference in its entirety, and additionally claims priority from European Application No. EP 17189714.3, filed Sep. 6, 2017, which is incorporated herein by reference in its entirety.

BACKGROUND OF THE INVENTION

The present application concerns the field of wireless communication networks or systems, more specifically to a user device, systems and methods for implementing a multi-connectivity mode for a user device providing simultaneous or concurrent wireless communication links from a user device to a plurality of wireless network elements, like base stations, user equipment, UE, etc. Embodiments relate to a multi-connectivity mode using massive MIMO antenna technology and provide a multi-link user device, ML-UE.

FIG. 1 is a schematic representation of an example of a wireless network 100 including a core network 102 and a radio access network 104. The radio access network 104 may include a plurality of base stations, which may be referred to as enhanced Node-B=eNB, but may also be of type gNB, the term used for base station in 5G New Radio (NR), $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary Internet-of-Things (IoT) devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $eNB_1$ to $eNB_5$ may connected, e.g. via the X1 or X2 interface (in NR this interface may be referred to as Nx interface, e.g. N2 or N3), with each other via respective backhaul links $116_1$ to $116_5$, which are schematically represented in FIG. 1 by the arrows pointing to "eNBs". Deployment scenarios may also involve a mix of interconnected eNBs and gNBs operating in the same radio access network.

The wireless network or communication system depicted in FIG. 1 may by an heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations. Small cells may operate in general with much less transmit power. A Macro cell may operate with 46 dBm output power, where a small cell might operate with 30 dBm output power, and thus defining a larger or smaller coverage area. See e.g., WWRF Working Group C, Communication Architectures and Technologies", White Paper, "LTE Small Cell Enhancement by Dual Connectivity, 2014.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), the control resource set (CORSET) etc. For the uplink, the physical channels may further include the physical random access channel (PRACH or RACH) used by UEs for accessing the network once a UE is synchronized and obtained the MIB and SIB. The physical signals may comprise reference signals (RS), e.g., transporting channel state information (CSI), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. Smaller slot sizes consisting of <6 OFDM symbols, e.g. mini-slots in NR or short transmission time interval (sTTI) in LTE, shall also be supported. In the frequency domain, a mixed numerology with different subcarrier spacing, e.g. 30 kHz, 60 kHz, based on NRs numerology with $\mu \in \{0,1,2,3,4,5\}$, shall be supported, see e.g. TS38.211.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE, LTE-A, LTE-Advanced pro standard or the 5G or NR (New Radio) standard.

In a wireless network as depicted in FIG. 1, like a LTE or 5G/NR network, massive MIMO (Multiple Input Multiple Output) may be implemented as an antenna technique for some or all of the wireless network elements or entities in the network, e.g., at the base stations and/or user devices, for improving the spectral efficiency per site/cell at the network side. To implement massive MIMO technology at a base station, which is usually operated using sectorized antennas, one or more antenna arrays may be provided enabling the base station to adaptively create spatial or directional beams focusing energy into dedicated subspaces where active users are present. At the same time, interference to other users may be reduced. Implementing massive MIMO may create a so-called super sectorization which may be realized adaptively on a user basis, on a user group basis or even in a fixed manner creating virtual small cells at static positions. Massive MIMO in the downlink, DL, improves at the user devices, UE, the effective SINR, Signal-to-Interference-plus-Noise Ratio (SINR), as well as the overall sum rate at users multiplexed to the same resources.

Although user devices may be equipped with an antenna array or multiple antennas, massive MIMO techniques, in general, are implemented only at the network side, thereby increasing only the network centric complexity, while the UEs may remain unchanged and simply experience a better-structured interference environment in terms of SINR improvements, and therefore potentially a higher throughput. Even when considering user devices equipped with an antenna array or multiple antennas to provide, e.g., MIMO schemes in the uplink, the connection is only to a single base station via multiple beams from the antenna.

Other concepts improving UE performance include Coordinated Multi-Point, CoMP, techniques, which involves a synchronized coherent transmission in the downlink and joint processing in the uplink, UL, for improving the SINR, especially at cell borders suffering from inter-cell interference. Further, when implementing a Zero Forcing, ZF, or a Minimum Mean Square Error, MMSE, transmit precoding for CoMP, accurate channel knowledge may be used, like the channel state information, CSI, to correctly place spatial nulls. A significant measurement overhead is involved as a significant number of CSI measurement values is needed, which are transferred to and distributed among the entities in the network. This results in an excessive use of uplink capacity, which may limit the robustness against channel-aging.

Another known approach in conventional wireless communication networks for improving UE data rates by link multiplexing is carrier aggregation, CA. In accordance with CA a UE uses a plurality of carriers, frequency bands, as provided by the communication standard, like the LTE standard.

Yet another approach for improving the stability of the connection of the UE over the air interface to the network is the provision of the so-called multi-SIM technology in accordance with which the UE is switches among different mobile network operators, MNOs, to select a connection over the air which appears to be the most stable connection, however, only one connection at a time is possible. When an existing connection becomes unstable or is no longer available, the UE has to select one of the other available network operators to see whether a stable connection to one of the other available networks is possible. Thus, when a connection becomes unstable, a termination of the connection and the establishment of a new connection is needed thereby interrupting the communication. UEs may be equipped with eSIM (electronic SIM) technology, which allows orchestration of SIM features by an operator, or by another authorization entity.

Other known approaches operate on the basis of different wireless or radio access technologies, also referred to as dual connectivity, so that a user device may access, e.g., a wireless mobile or cellular communication network using a first antenna as well as another network, e.g., LTE, a WiFi or Bluetooth network, using a second antenna. This involves independent transceiver circuits adding to the complexity of the UE and the power consumption.

From a UE perspective the data rates experienced in a wireless communication network depend heavily on the actual load of the serving base station, and even if the currently serving base station is able to provide a good capacity for the user, the per user capacity might change significantly when the user is handed over into the next cell when being on the move. In other words, data rates experienced at the UE depend on the condition of the connection to the serving base station which may improve when using a massive MIMO technique at the UE, implementing CoMP or using multiple SIMs. Still, in case of any problem with the communication link between the base station and the UE, the communication will be interrupted, disturbed or become unstable.

It should be noted that the above mentioned problems are not limited to a cellular wireless communication network depicted in FIG. 1, like a LTE or 5G/NR network, rather, such problems are experienced in any type of wireless communication network from satellite and cellular to local and personal area networks, e.g. wireless personal area networks, WPANs, wireless local area networks, WLAN, wireless ad hoc network, also referred to as wireless mesh network or mobile ad hoc network, MANET, wireless metropolitan area networks, wireless wide area networks, cellular networks, and global area networks.

SUMMARY

According to an embodiment, a user device for a wireless communication with a plurality of wireless network elements may have: a plurality of antennas, the plurality of antennas configured to form a plurality of spatial or directional beams, wherein the user device is configured to provide simultaneously a plurality of independent wireless communication links using the plurality of spatial or directional beams, wherein the user device is configured to provide a first wireless communication link with a first wireless network element using a first spatial or directional beam and to provide a second wireless communication link with a second wireless network element using a second spatial or directional beam.

According to another embodiment, a system may have: one or more wireless communication networks, each wireless communication network including one or more wireless network elements; and one or more user devices of one of the preceding claims, the user device for wireless communication with a plurality of wireless network elements of the one or more wireless communication networks.

According to another embodiment, a method for a wireless communication of a user device with a plurality of wireless network elements may have the steps of: forming, at the user device, a plurality of spatial or directional beams, providing simultaneously a plurality of independent wireless communication links using the plurality of spatial or directional beams, wherein a first wireless communication link is provided between the user device and a first wireless network element using a first spatial or directional beam, and a second wireless communication link is provided between the user device and a second wireless network elements using a second spatial or directional beam.

Another embodiment may have a non-transitory digital storage medium having a computer program stored thereon to perform the method for a wireless communication of a user device with a plurality of wireless network elements, the method including the steps of forming, at the user device, a plurality of spatial or directional beams, providing simultaneously a plurality of independent wireless communication links using the plurality of spatial or directional beams, wherein a first wireless communication link is provided between the user device and a first wireless network element using a first spatial or directional beam, and a second wireless communication link is provided between the user device and a second wireless network elements using a second spatial or directional beam, when said computer program is run by a computer.

BRIEF DESCRIPTION OF THE DRAWINGS

Embodiments of the present invention are now described in further detail with reference to the accompanying drawings, in which:

FIG. 10 illustrates an example of a computer system on which units or modules as well as the steps of the methods described in accordance with the inventive approach may execute.

DETAILED DESCRIPTION OF THE INVENTION

Embodiments of the present invention will now be described in more detail with reference to the accompanying drawings in which the same or similar elements have the same reference signs assigned.

The present invention provides a user device for a wireless communication with a plurality of wireless network elements, the user device comprising a plurality of antennas, the plurality of antennas configured to form a plurality of spatial or directional beams, wherein the user device is configured to provide simultaneously a plurality of independent wireless communication links using the plurality of spatial or directional beams, wherein the user device is configured to provide a first wireless communication link with a first wireless network element using a first spatial or directional beam and to provide a second wireless communication link with a second wireless network element using a second antenna beam.

Figure 2:
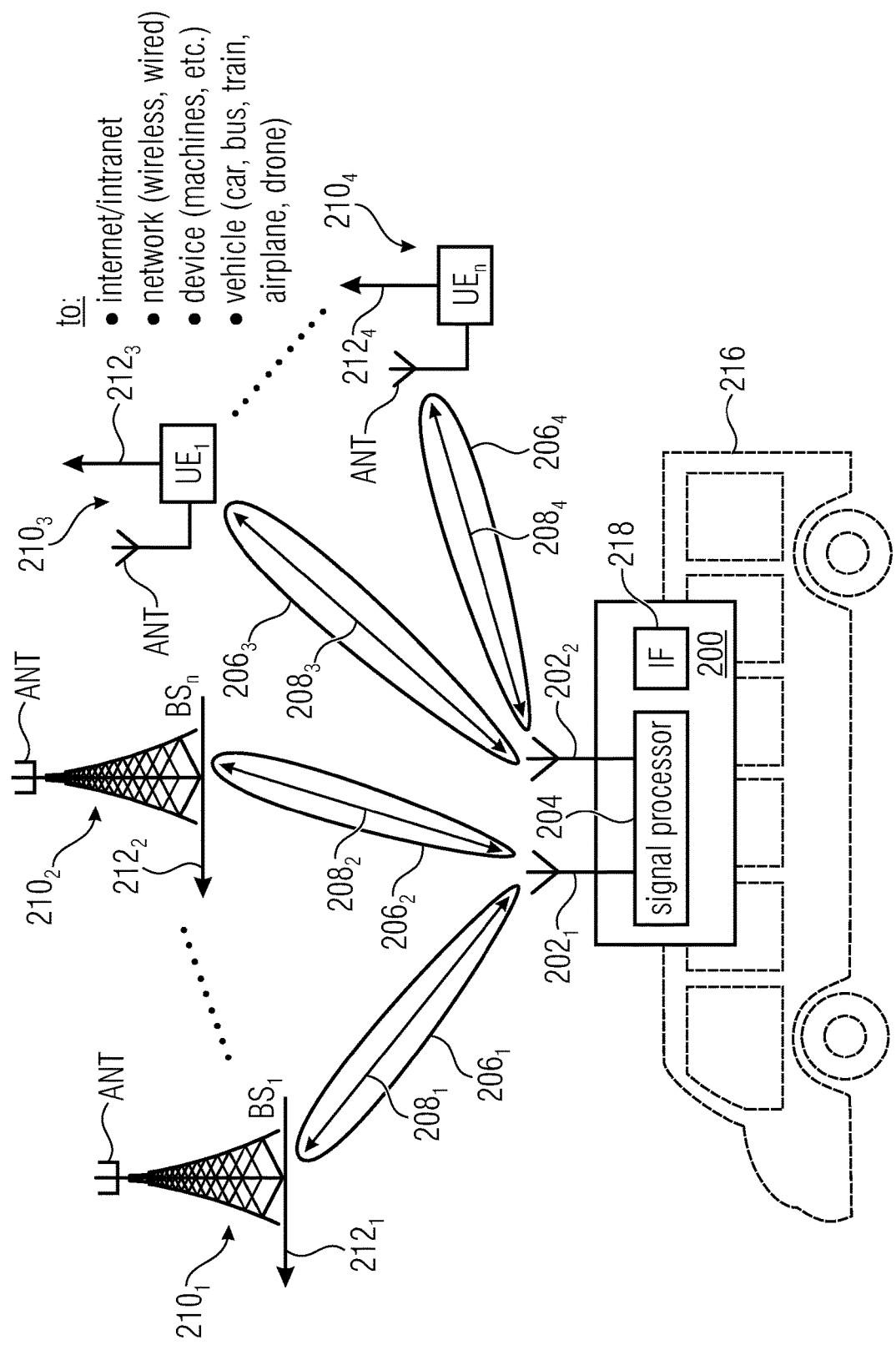
FIG. 2 is a schematic representation of a user device in accordance with an embodiment of the present invention.

FIG. 2 is a schematic representation of a user device in accordance with an embodiment of the present invention, which is also referred to as a multi-link UE (ML-UE). The user device 200, also referred to as user equipment, UE, includes a plurality of antennas $202_1$ and $202_2$, for example two or more single antennas or one or more antenna arrays each including a plurality of antenna elements. The UE 200 includes a signal processor 204 coupled to the antennas $202_1$, $202_2$ for processing signals to be sent from the UE and for processing signals received at the UE. The signal processor 204 may include a precoder to form of a plurality of spatial or directional beams by the antennas $202_1$, $202_2$. In the embodiment depicted in FIG. 2, which is only a schematic representation of the antenna/antenna array 202, it is assumed that the UE controls the antennas $202_1$, $202_2$ to form four antenna beams $206_1$-$206_4$ to provide respective unidirectional or bi-directional communication links $208_1$-$208_4$, also referred to as wireless communication links, between the UE 200 and different wireless network elements $210_1$-$210_4$.

In other words, the antenna 202 including the plurality of antenna elements or the plurality of antennas simultaneously or at the same time forms the plurality of spatial or directional beams at the same or different frequencies to enable a parallel communication or transmission over the plurality of wireless communication links $208_1$-$208_4$. For example, the user device 200 handles the first wireless network element $BS_1$ via the first wireless communication link $208_1$ independent of the connection to the second wireless communication element $BS_n$ via the second wireless communication link $208_2$ to keep the wireless communication links $208_1$, $208_2$ active at the same time or ready to be activated, for example over an allocated period of time, like several radio frames. In other words, the spatial beams formed by the inventive UE 200 are independent in the sense of link control or MIMO link control between the UE 200 and the different network elements $210_1$-$210_4$ so that, for example, even if one of the wireless communication links fails, the others are still maintained.

When referring to the "handling" of the respective connections to the respective network elements via the respective wireless communication links independent of each other, in accordance with embodiments, it is meant that the UE 200 handles each link as if the others would not be there, for example, the UE 200 may synchronize on a broadcast channel of several base stations or several network elements, and, as a result, the UE 200 handles several links to the different network elements in parallel without the respective network elements necessarily knowing that these parallel links actually exist. In accordance with examples, the UE may indirectly control the distribution of the traffic over the different links.

In accordance with embodiments, besides the above mentioned synchronization, the handling of the respective connections may also include the decoding of the downlink broadcast channel, the handling of the initial access to the respective network element, the link control, rate requests, the handover initiation, link reporting and the like.

As mentioned above, the wireless communication links $208_1$ to $208_4$ may be unidirectional for providing a communication from the UE towards the respective wireless network elements, or they may be bi-directional to receive information from the network elements at the UE. In the latter case, in accordance with further embodiments, the user device 200 may receive control information for coordinating transmissions over the plurality of wireless communication links $208_1$ to $208_4$. For example, when considering a scenario in which a service provider, like a video streaming service, provides the data to the user device via the plurality of links, the service provider may monitor the performance of the respective links and decide, for example, the amount of data to be transmitted over the respective links so that, in this scenario, the respective control information would be provided by the service provider and signaled to the user device 200 via the respective base stations. In accordance with other embodiments, the respective wireless networks elements, like base stations in the wireless network, may have knowledge about the parallel existing wireless links 208 from the user device to the plurality of network elements, and on the basis of such knowledge, information about the respective wireless communication links 208 may be exchanged among the involved wireless network elements, for example via backhaul connections among base stations of the networks, to decide, on the basis of parameters associated with and detected for the links how transmissions should be coordinated over the respective links, for example to send a majority of data over a first number of links and the remaining parts over a second number of links having different link conditions.

Figure 1:
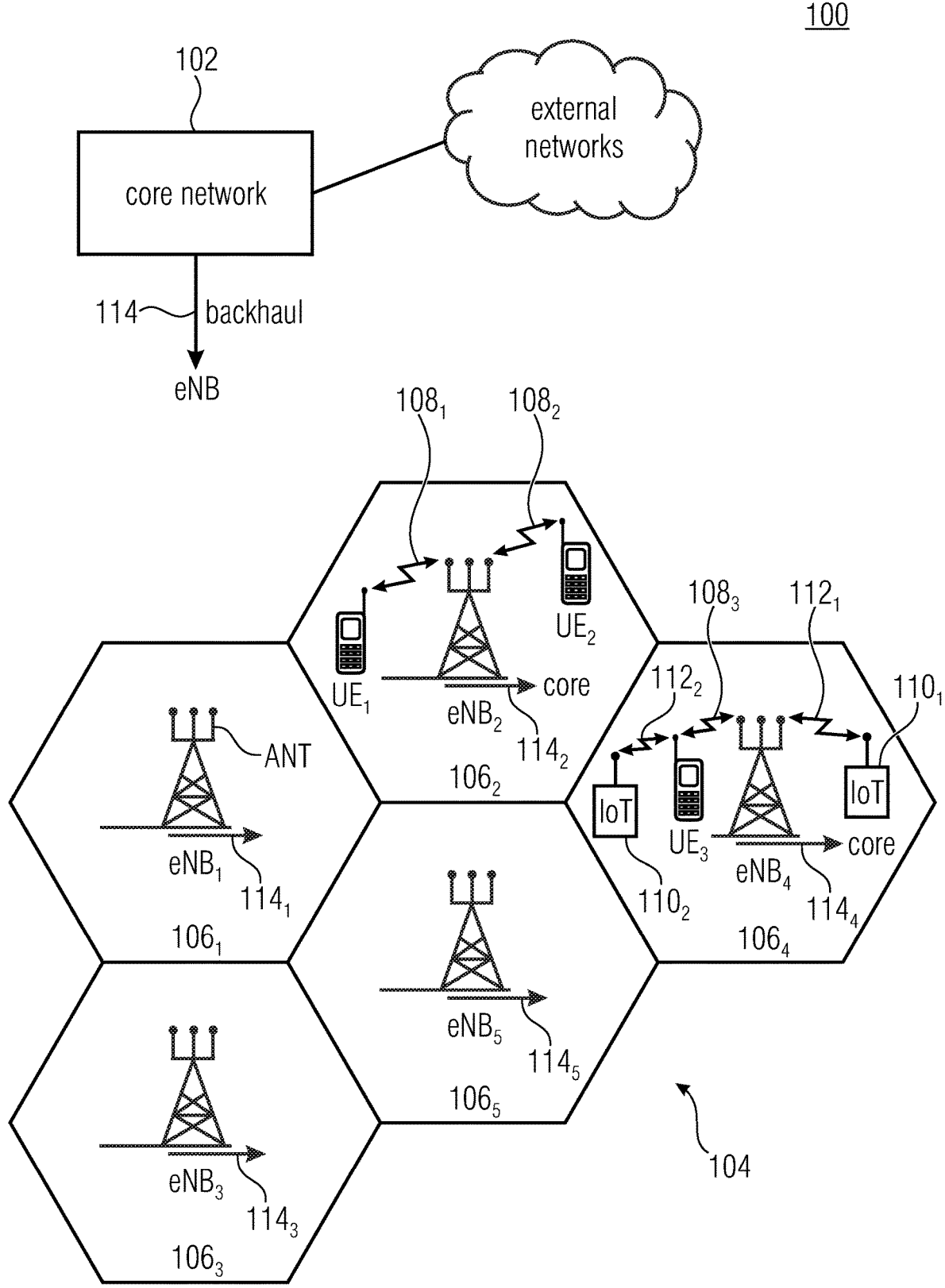
FIG. 1 shows a schematic representation of an example of a wireless communication system.

As is indicated schematically in FIG. 2 by the arrows $212_1$-$212_4$ the entities $210_1$-$210_4$ may have a connection or interface to yet other entities. The base stations $BS_1$-$BS_n$ may have a connection to the core network and/or a connection among themselves, as well as a connection, via the core network, to external networks or entities. In accordance with embodiments, the wireless network elements $210_1$-$210_4$ may include base stations $BS_1$-$BS_n$ of a wireless communication network, like the one shown in FIG. 1. The base stations may be part of a network operated by a single mobile network operator MNO. In accordance with other embodiments, the base stations may be from different networks, i.e., networks operated by different mobile network operators MNOs.

The entities $210_3$, $210_4$ may be connected, via the interfaces $212_3$-$212_4$, to a further network, which may be a wireless or wired network, or it may be an external network, like the internet or an intranet within a company. In accordance with other embodiments, the entities $210_3$, $210_4$ may be part of or may be included in a device, like a machine or a vehicle. Also the inventive UE 200 may be connected to a further network, like a wireless network or wired network, or may be connected to the internet or the like. In other words, the respective connections may be to other user devices $210_3$, $210_4$, which may be user devices connected to any kind of communication network, or entities which are connected to physical devices, like machines, vehicles or other physical entities. The user devices $210_3$, $210_4$ provide network connectivity for a communication of a physical device with the UE 200.

In accordance with embodiments, the entities $210_3$, $210_4$ may include user devices in accordance with the teachings of the present invention.

In accordance with yet other embodiments, the UE 200 may be connected to a device involving a reliable communication via a plurality of independent, parallel communication links 208. The UE 200 may be coupled to or incorporated into a machine or a vehicle, like a car, a bus, a train or an aerial vehicle, like a drone. In FIG. 2 the UE 200 is shown as a part of a bus 216, and includes an interface 218 for a connection to elements of the bus 216 or to enable passengers in the bus to connect to the UE. The interface may provide a connection to a wireless interface, e.g., a WiFi interface, or it may be the wireless interface so that the UE 200 acts as an aggregation node or a hotspot for passengers in the bus. For example, passengers in the bus may connect to the internet via one or more mobile communication network infrastructures using the UE 200, which provides the plurality of links 208 that ensure that at least one link is maintained while the bus travels. In other words, the UE 200 provides a mobile hotspot for the users in the vehicle 216, and the users may connect with a high reliability to a cellular network or to a plurality of cellular networks via the high data rate wireless interface 218.

In accordance with other embodiments, when implementing the UE 200 as part of, e.g., a passenger car, rather than providing a backhaul for many connections of many users, the UE may be used for aggregating bandwidth that may be needed, for example for a live video transmission. This is achieved by aggregating as many physical links 208 as possible, i.e., to set up links 208 by respective spatial beams provided by the antenna array 200 to as many network entities 210 as possible. This provides for the plurality of physical links thereby aggregating the bandwidth available and ensuring, e.g., a reliable live video transmission.

According to other embodiments, the UE 200 may be a fixed hotspot mounted to or being part of a stationary entity, like a building.

Thus, embodiments of the present invention provide multi-link connectivity by employing a plurality of antennas or one or more antenna arrays, like massive MIMO arrays, at the UE side and treating the multiple entities 210, like the BSs, the same way like UEs when seen in the downlink from a massive MIMO base station. The inventive approach provides advantages over conventional approaches, as there is little or no need to inform the actual network about the existence of parallel independent links 208 either within the same network or in different networks so that the inventive user device may be introduced seamlessly into existing network infrastructures. Further, the inventive approach, which provides the spatial or directional beams 206 by the antennas, reliably separates the links 208 between the UE 200 and the respective entities $210_1$-$210_4$ thereby improving, e.g., the reliability, diversity, data rate, multiplexing procedures. Also faster hand over procedures may be implemented.

In the embodiment of FIG. 2, the UE 200 has been described as being implemented as part of a bus 216, however, the inventive approach is not limited to such embodiments, rather, the inventive user device may be any device including one or more of electronics, software, sensors, actuators or the like, as well as network connectivity. For example, the inventive user device may be implemented in the form of stationary or mobile devices, like handheld devices, for example smartphones, PDAs, computers and the like, ground-based vehicles, such as robots, cars, trains, aerial vehicles, such as manned and unmanned aerial vehicles, the latter also referred to as drones. The user device may be included or attached to a physical device, a building or any item having embedded therein the above mentioned network connectivity. In accordance with embodiments, the network connectivity enables the user device to scan/search for, detect, initiate, establish, discontinue/terminate, handover, maintain or monitor a connection to the wireless network element via the respective wireless communication links, for example to exchange data and/or to follow or track control channels. For example, in some cases it may be sufficient if the user device is able to simply track links to have a kind of "list" of available links that may be activated if needed, for example when one of the links shown in FIG. 2 starts to fail, another link already monitored by the UE may be selected for taking over the wireless link provided by the failing link. In such case, the user device is not actively transmitting or communicating all the time over the link but it follows the links passively.

As mentioned above, the wireless network elements may be base stations or other user devices, however, in accordance with yet further embodiments they may include one or more link forwarding elements, for example a relaying device for one or more further user devices. The just mentioned relaying device may be, for example a satellite or a repeater, or a combination of another user device and WiFi access point.

Figure 3:
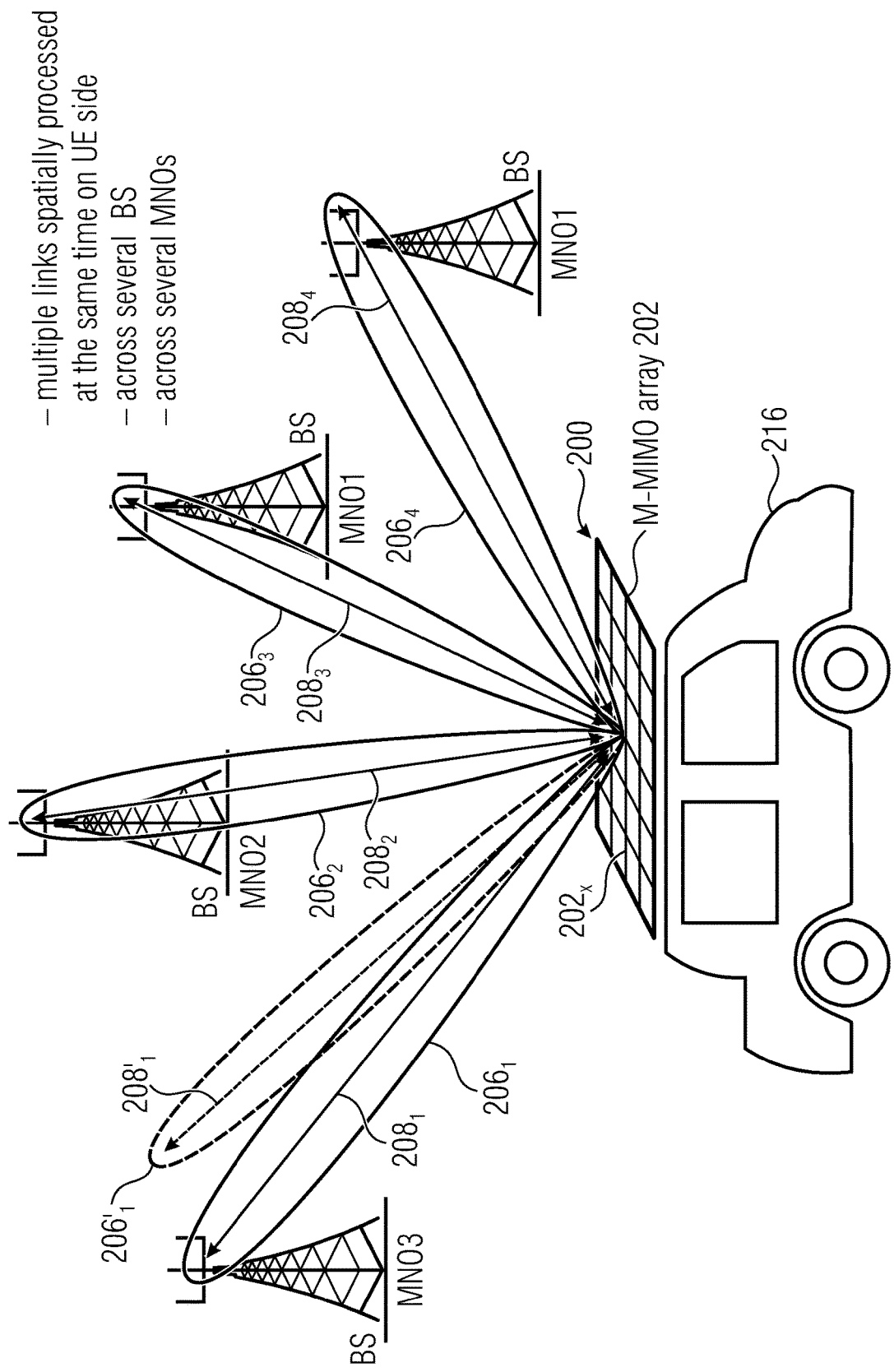
FIG. 3 shows another embodiment for implementing the inventive user device.

FIG. 3 shows another embodiment for implementing the inventive user device 200. In the embodiment of FIG. 3, the user device 200, which is depicted only schematically, is part of a vehicle, like a passenger car 216, and the antenna is formed by a massive MIMO, M-MIMO, array antenna. Four spatial/directional antenna beams $206_1$, $206_2$, $206_3$ and $206_4$ are formed by the antenna array over which respective the independent wireless communication links $208_1$ to $208_4$ are established to respective base stations BSs being part of different mobile network operators $MNO_1$-$MNO_3$. The multiple links $208_1$ to $208_4$ are spatially processed at the same time at the UE side across the several base stations BSs and across the different mobile network operators. Thus, embodiments of the present invention introduce a new class of multi-link UE, also referred to as ML-UE, and a system in accordance with which the multi-link is realized by spatial multi-links formed at the UE side to different base stations or wireless network elements which may operate at the same or at different frequencies or at the same or different frequency bands.

The antenna array 202 forms the respecting spatial beams $206_1$ to $206_4$ in such a way that the UE 200 will recognize different base stations of the same or different mobile network operators and to set up a connection to the different base stations independent from each other, by forming the respective spatial/directional beams using different antenna elements $202_x$ of the antenna array 200. In accordance with the embodiments, the antenna may operate at frequencies above 6 GHz, for example it may operate in the millimeter band or with millimeter waves, and the antenna array may be a linear antenna array, like a Uniform Linear Array, ULAs, a planar antenna array, like a Uniform Planar Array, UPA, a cylindrical array or the like.

In accordance with the inventive approach, by providing multiple wireless communication links 208 from the UE 200 by the different spatial beams 206, the communication is improved as it is more robust as even in case one of the links is fading or disappearing, for example because it is temporarily blocked, which may be a scenario that happens often in mobile applications, for example, when the device 216 moves, still a reliable communication via the remaining non-blocked links exists.

FIG. 2 and FIG. 3 show examples for systems including one or more wireless communication networks, each of which includes one or more wireless network elements, like base stations or other user devices, and in which the inventive user device is located for a wireless communication with a plurality of the wireless network elements. Although FIG. 2 and FIG. 3 show systems in which only a single user device in accordance with the inventive approach is provided, the present invention is not limited to such embodiments, rather, in such systems a plurality of the inventive user devices 200 may be provided.

FIG. 3 shows an embodiment, in which only the inventive user device includes the antenna array 202 having the plurality of antennas or antenna elements $202_x$, like a massive MIMO antenna array, and the respective base stations BS of the wireless communication network are assumed to include sector antennas or omnidirectional antennas. However, in accordance with other embodiments, both the user device 200 and the base stations BS of the wireless communication networks may include antenna arrays to create a multipoint-to-multipoint, MP2MP, connectivity between the base stations BSs and the user device 200. Naturally, in accordance with yet further embodiments, not all of the base stations of the wireless communication networks but some of them are provided with antenna arrays. In accordance with further embodiments, when one or more of the base stations BSs of the wireless communication networks are provided with antenna arrays, a high-order multiplexing scheme may be employed for the communication between the UE 200 and the respective BSs having also antenna arrays, for establishing between the UE and at least one of the wireless network elements a plurality of parallel spatial layers, for example, for increasing the data rate over the wireless communication link between the user device 200 and the wireless network element. For example, when considering the link $208_1$ in FIG. 3, and assuming that also the associated base station BS of the mobile network operator $MNO_3$ is provided with an antenna array, like a massive MIMO array, the actual link $208_1$ may be formed by a plurality of spatial beams $206_1$, $206_1'$ thereby providing for a plurality of parallel wireless links from the UE 200 to the base station BS of $MNO_3$ thereby increasing in the data rate.

In accordance with embodiments, the plurality of independent wireless communication links $208_1$ to $208_4$, as they are, for example, shown in FIG. 3 may be orchestrated at the network side, at the user side, by a service or a combination thereof, wherein the service may be located inside or outside the network or the user device. The traffic over the wireless communication link may also be referred to as an end-to-end, E2E, traffic, for example the traffic from an external service provider to the UE 200 or a device coupled to the UE 200, as will be described below with reference to FIG. 4 and FIG. 5 below.

In other words, in accordance with embodiments, the orchestration may be at a service level which is not necessarily located in the network or in the UE 200, rather, it may be an entity behind the actual network, like a server in the internet. The orchestration of the traffic may be done by the UE, which is referred to a UE centric multi-connection orchestration, by a service hosted somewhere locally or in a distributed fashion, referred to as service centric multi-link orchestration, or by one or more of the network elements, like the above mentioned base stations, which is referred to as a network centric multi-connection orchestration.

In accordance with embodiments the UE 200 may use a novel connectivity identification to connect to the several wireless network elements at the same time, for example, virtual multi-UE IDs may be used in cases in which a network is not able to handle a multi-link anchored UE to provide for a fallback for legacy networks and multi-connectivity to several networks operated by different mobile network operators. In accordance with other embodiments, the ML-UE 200 may identify itself with one or more networks as a relay and, either no UE ID is needed, or a relay ID is used. For example, the IDs of the entities, like UEs, coupled to the relay may be encapsulated at the relay so that these UEs via the relay, may also use the networks of different or foreign mobile network operators.

Figure 4:
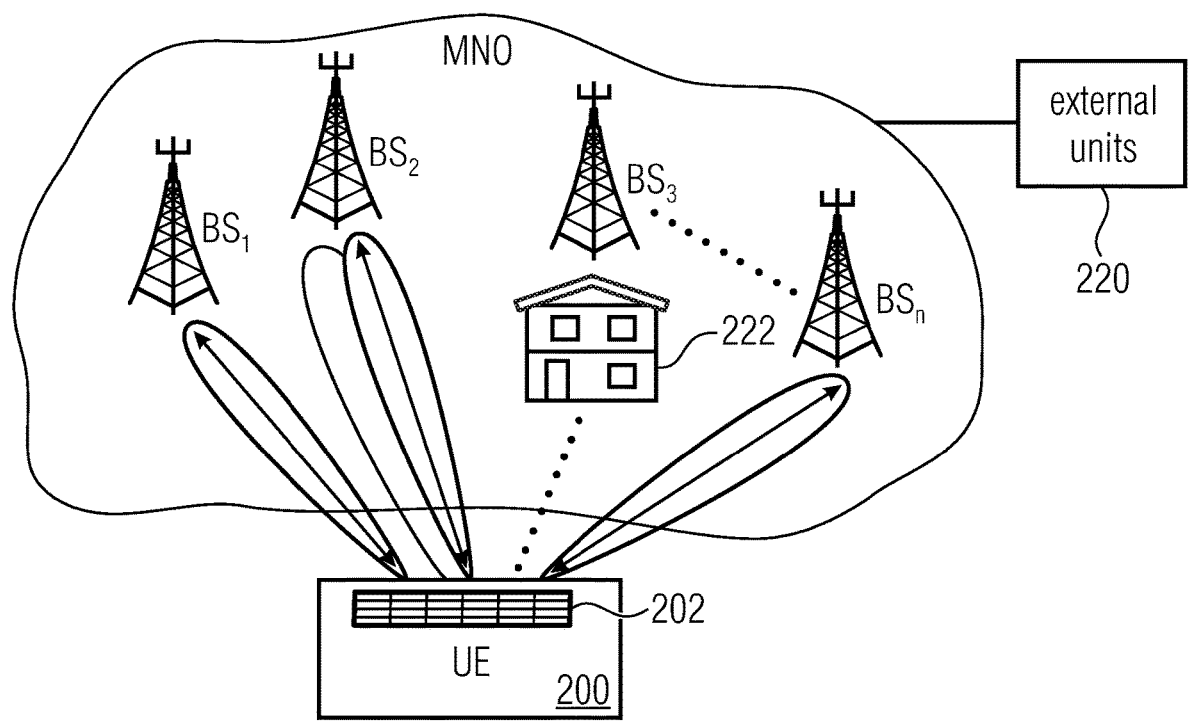
FIG. 4 illustrates an embodiment in which network elements are operated by the same mobile network operator.

As described above, the wireless network elements, like the base stations or UEs in FIG. 2 and FIG. 3 may be part of one or more wireless communication networks. For example, the one or more wireless communication networks may include one or more wireless networks operated by the same mobile network operator, a situation that is schematically depicted in FIG. 4 showing the UE 200 forming three spatial beams using the antennas 202 for three independent wireless communication links to base stations $BS_1$, $BS_2$ and $BS_n$ which are elements of a network operated by the same operator. The UE forms three spatial beams to provide for a high connection reliability, for example to external unit 220 coupled to the wireless communication network, for example a video streaming service, rather than connecting, as is usual in the known approaches, to only a single base station. In accordance with the inventive approach, the three spatial beams provided by the antenna 202 form independent wireless communication links to the base stations, i.e., a sufficient number of links is provided so that also situations in which a connection to one of the base stations is not possible, e.g., to base station $BS_3$ due to an obstacle 222 in the communication path, a sufficient number of connections or links is established and the high reliability and high data throughput is achieved.

Figure 5:
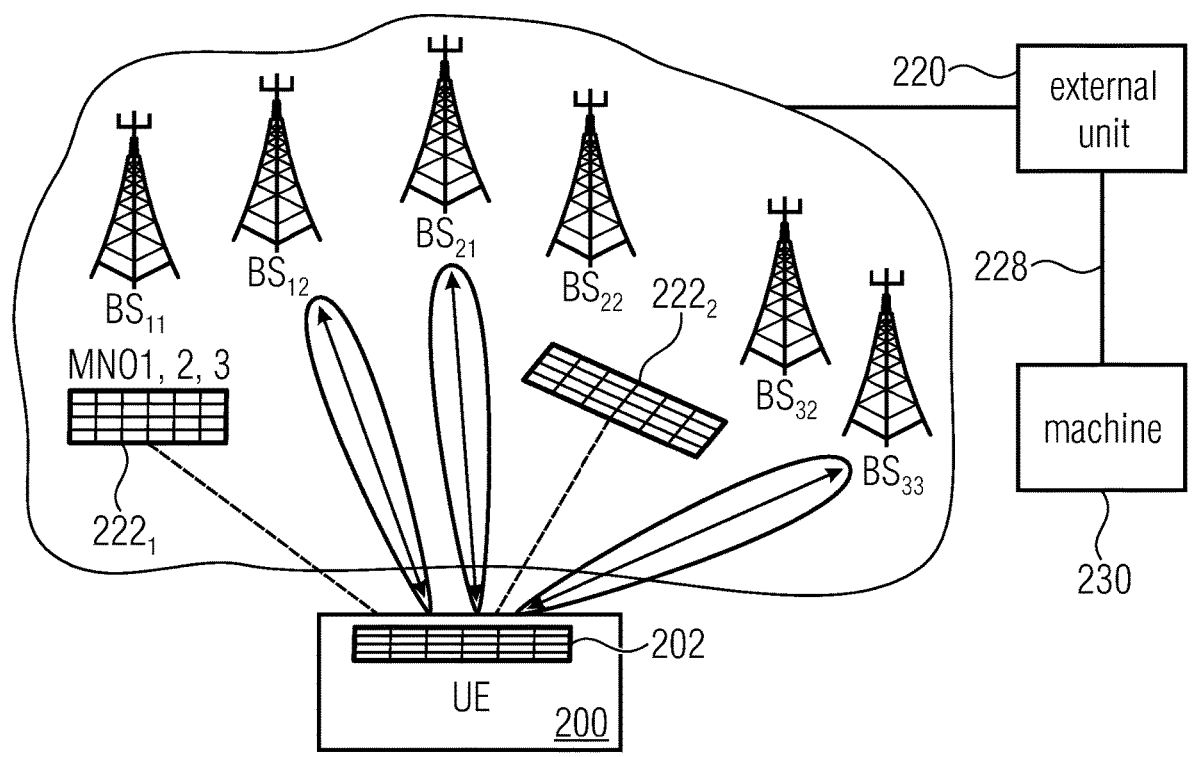
FIG. 5 illustrates an embodiment in which network elements are operated by different mobile network operators.

In accordance with other embodiments, the UE may connect to wireless network elements which are part of wireless communication networks operated by different operators, as is schematically represented in FIG. 5. Again, the UE 200 is shown with the antenna 202 forming three spatial beams for establishing three independent wireless communication links. In the scenario of FIG. 5 it is assumed that base stations of three different mobile network operators 1, 2 and 3 are available, and the UE provides for the wireless communication link to the base station $BS_{12}$ of the first operator, base station $BS_{21}$ of the second operator and base station $BS_{33}$ of a third operator to provide a reliable connection to the network and, via the network, to the external unit 220 thereby avoiding any problems with obstacles $222_1$, $222_2$, or problems with base stations not operating in accordance with desired characteristics or being overloaded and not providing for a sufficient throughput.

The above embodiments have been described in connection with cellular wireless communication networks, however, the inventive approach is not limited to such networks. The inventive approach may be implemented in any type of wireless communication network from satellite and cellular to local and personal area networks, e.g. wireless personal area networks, WPANs, wireless local area networks, WLAN, wireless ad hoc network, also referred to as wireless mesh network or mobile ad hoc network, MANET, wireless metropolitan area networks, wireless wide area networks, cellular networks, and global area networks. Further, the inventive approach may be implemented in an environment combining any of the just mentioned networks. In other words, the wireless communication networks mentioned above may operate on the basis of the same radio access technology, RAT, or on the basis of different RATs. Examples for the radio technologies are the following:

LTE, LTE-A, LTE-A Pro
5G/NR
LTE V2X
enhanced V2X, eV2X of 5G/NR,
IEEE 802.11,
IEEE 802.11p DSRC,
Bluetooth,
WiFi variants like IEEE 801.11ad, IEEE 802.11ay, IEEE 802.11ac, and
ETSI DECT and variants thereof.

Also, the network elements to which the UE 200 may form a wireless link may be selected from any one of the above mentioned wireless communication networks. Beyond that, in accordance with yet further embodiments, the wireless network elements may be included or may be part of other entities, like buildings, machines, vehicles or the like which, in turn, may be connected to further networks.

In accordance with further embodiments, the above described wireless network elements, like the base stations and other entities may use, within the network of which they are part of, the same or different network resources. For example, when considering FIG. 4, some or all of the base stations $BS_1$-$BS_n$ involved in the connection to the UE 200 may operate on the same resources or they may use different resources. For example different frequencies or different frequency bands for transmitting the resource elements associated with/mapped to the respective wireless communication links may be used. This also applies for wireless network elements operating in different networks.

In the embodiments described above with reference to FIG. 4 and FIG. 5, reference has been made to base stations of mobile network operators, however, the inventive approach is not limited to such scenarios, rather, in accordance with embodiments, instead of or in addition to the base stations in FIG. 4 and FIG. 5, one or more of the communication links provided by the spatial beams of the UE 200 may be to networks employing a different radio access technology, for example WiFi networks, Bluetooth networks or DECT networks to implement, for example, a WiGig link (IEEE 802,11ad or IEEE 802.11ay) at 60 GHz, a WiFi link at 5.2 GHz, a 4G or 5G link at 3.5 GHz or at any other band.

In the embodiments of FIG. 4 and FIG. 5, the user device 200 has been described as communicating with a video streaming service 220, however, any kind of service provider may be implemented, e.g. a URLLC service.

The external unit 220 of FIG. 4 and FIG. 5 may also be referred to as a destination with which the user device 200 communicates. The external unit 220 may implement a service for a remote machine operation or a closed loop control of a machine. The service provider 220 may provide a URLLC service and is connected via further link 228 to a machine 230, as is shown in FIG. 5. The interface 228 may be a direct, wireless or wired communication between the external unit 220 and the entity 230, or it may be a connection via another network, for example, an intranet or the internet.

In accordance with the yet further embodiments of the inventive approach, the destination 220 may be one or more of the network elements, for example one or more of the base stations described above with reference to FIG. 2 to FIG. 5. In such scenarios, the additional entity 230 is connected to the mobile communication network shown in FIG. 4 and FIG. 5 or directly to one of the network elements, like one of the base stations. For example, when considering FIG. 4, the external unit 220 may be coupled to one or more of the base stations $BS_1$ to $BS_n$.

In the examples as described with reference to FIG. 5, the entity forming the destination of a communication of the UE has been shown as a machine 230 coupled to the external unit 220. In other words, the destination may be towards the next network node, for example a base station, or it may be a multi-hop to other nodes, like another UE, or a car, thereby making the UE a kind of relay or forwarding node.

In accordance with other embodiments, the entity being the destination may be a mobile device, like a vehicle. Dependent on where the UE 200 is provided, for example if it is provided in another machine or in another vehicle, a M2M, V2V or V2X communication may be implemented.

Figure 6A:
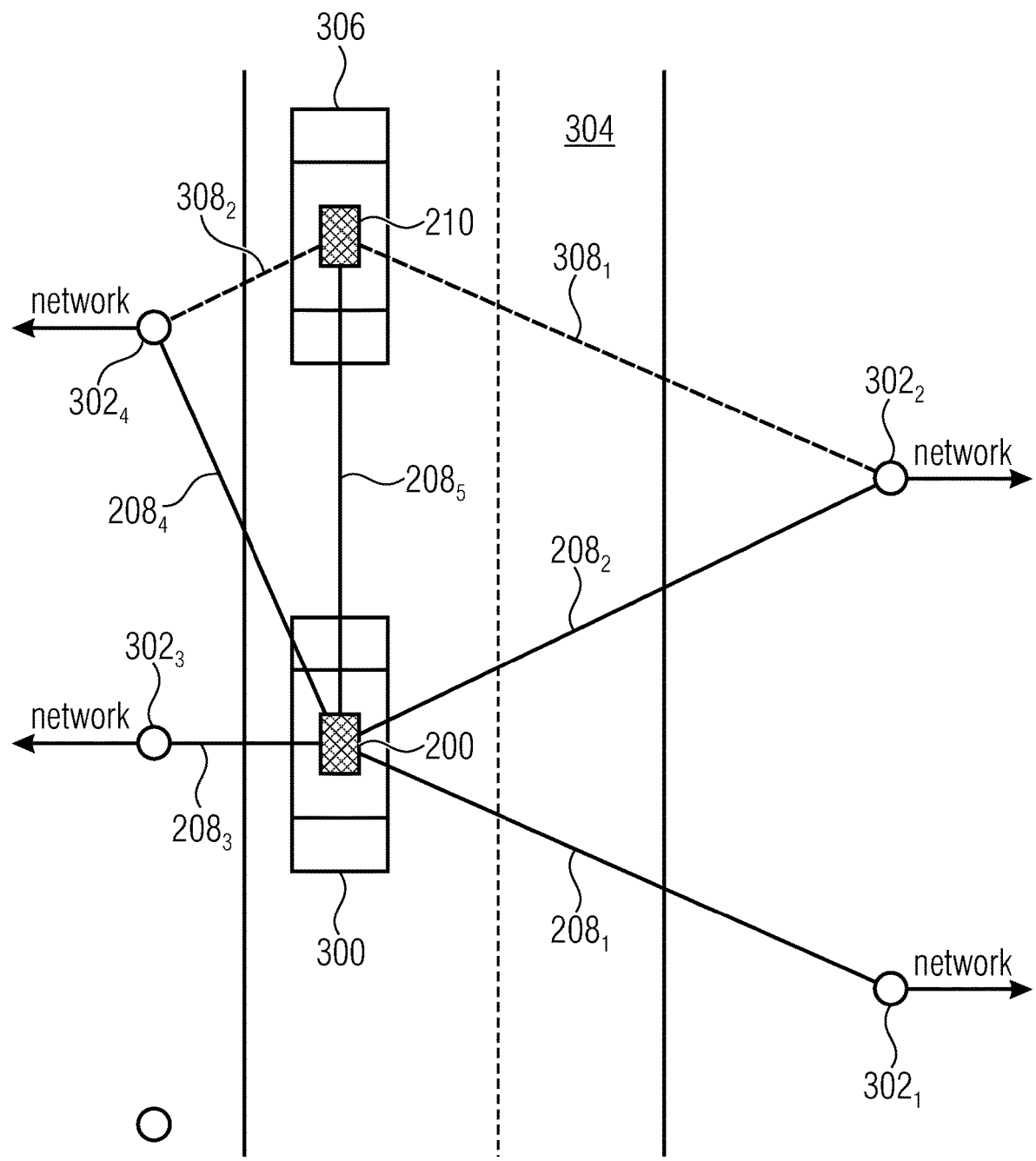
FIG. 6a illustrates another embodiment in accordance with which the UE, which is implemented in accordance with the teachings described herein, is coupled to a vehicle.

FIG. 6a illustrates an embodiment in accordance with which the UE 200, which is implemented in accordance with the teachings described herein, is coupled to a vehicle 300 and provides a plurality of wireless communication links $208_1$ to $208_5$ using respective spatial or directional beams formed by the antenna array 202 of the user device 200. The wireless communication links $208_1$ to $208_4$ provide for a V2X communication to a plurality of roadside units $302_1$ to $302_4$ each including a wireless network element (not shown), like a small cell base station, for establishing the wireless communication links 208. The roadside entities 302 may be lanterns, traffic signs, or buildings along the road 304, and the respective units 302 may be connected to a common network or to different networks for a communication with external entities, as described above with reference to FIG. 4 and FIG. 5. In addition, the vehicle 300, via the inventive UE 200, may establish a V2V communication to a further vehicle 306 via the wireless communication link $208_5$ also formed by one of the spatial or directional beams generated by the antennas of the UE 200. The further vehicle 306 includes, in a similar way as the roadside entities, a network element 210 for a wireless communication. The network element 210 may be any device providing for a network connectivity, and in accordance with embodiments, the wireless network element 210 may also be formed by a user device 200 in accordance with the inventive approach. As is shown by the dotted lines $308_1$, $308_2$ the further vehicle 306 is also connected to roadside entities $302_2$ and $302_4$. For a reliable communication between the two vehicles 300, 306, the inventive user device 200 provides, in addition to the direct link $208_5$, a multi-connectivity via the further independent wireless communication links $208_2$, $208_4$, and via the wireless links $308_1$, $308_2$ from the two roadside units $302_2$ and $302_4$, which may relay the communication from the vehicle 300 to the vehicle 306.

With reference to FIG. 6a it is noted that in accordance with other embodiments, rather than ground based vehicles also aerial vehicles may be used, for example unmanned aerial vehicles, like drones, may be provided with the inventive user device 200 for a multi-connectivity to a plurality of stationary elements provided along a flight path of the device yielding a more reliable connection of the drone to a network for receiving control information and for sending positional information back to the system, for example.

Figure 6B:
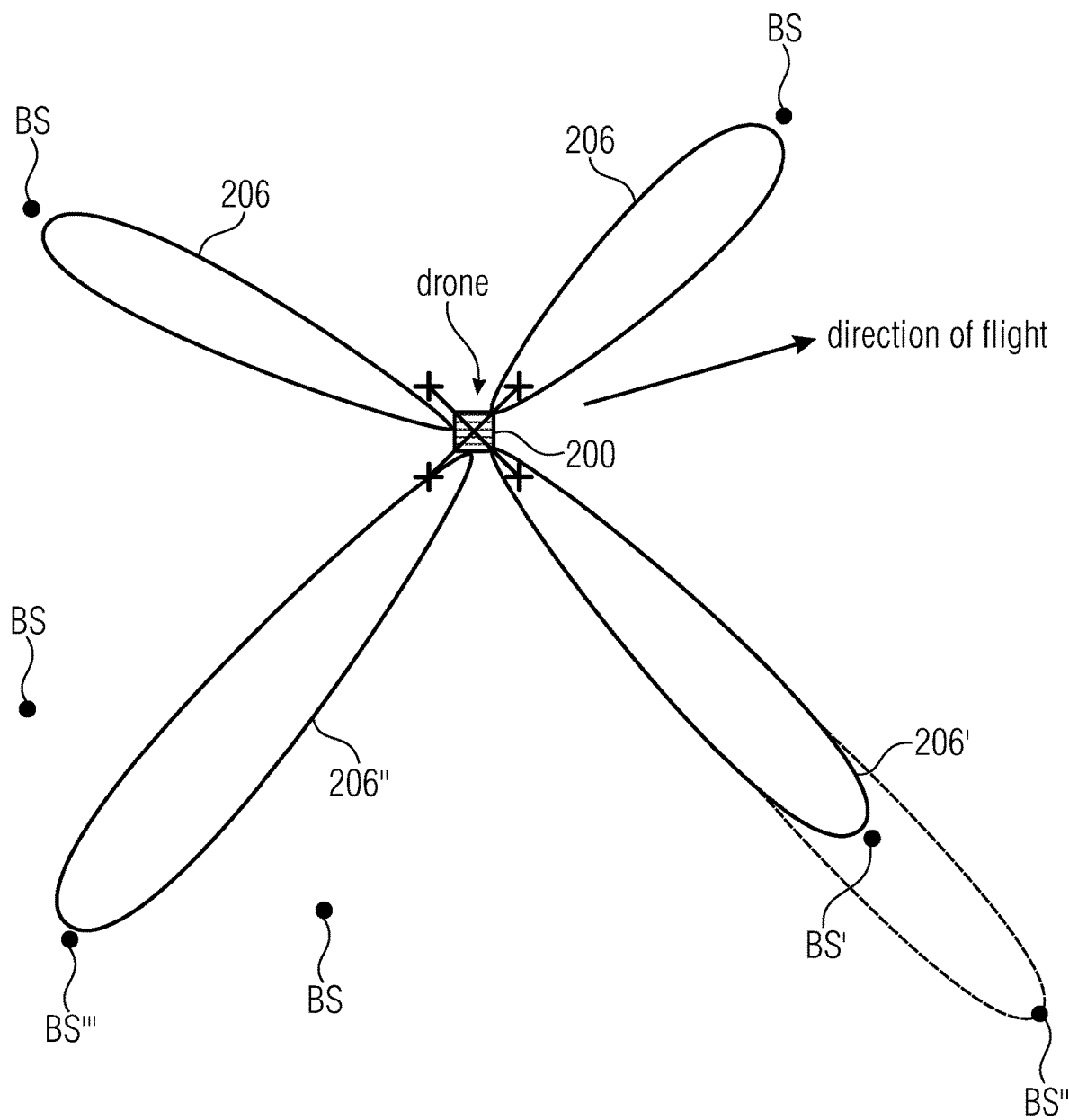
FIG. 6b illustrates another embodiment in accordance with which the UE, which is implemented in accordance with the teachings described herein, is coupled to an aerial vehicle.

FIG. 6b illustrates another embodiment in accordance with which the UE, which is implemented in accordance with the teachings described herein, is coupled to an aerial vehicle, line an airplane or a drone. In FIG. 6b a drone is shown including the inventive user device 200 connecting to the base stations BS on the ground via the respective beams 206. In the situation depicted in FIG. 6b the UL connection from the UE 200 to BS' may cause an interference with BS" as BS' and BS" are in the same sector covered by beam 206'. All potentially interference affected BSs having knowledge about the UE 200 and its associated UL RS may report a sensed interference experienced due to the UE 200 and an multi-link orchestrator (see below) in the network may manage the links 206 accordingly to reduce interference levels. For example, instead of beam 206' another beam 206" directed towards BS'" may be used for the UL.

The same is valid for the downlink selection in that the UE 200 may recognize interference levels from BS" during the DL connection from BS' to the UE 200 interfered by BS" and switch the active beam to 206" accordingly.

In accordance with further embodiments, the aerial device may exploit the extended coverage of BSs for multi-link anchoring to BSs beyond those in the announced neighborhood lists of close proximity BSs.

Figure 7:
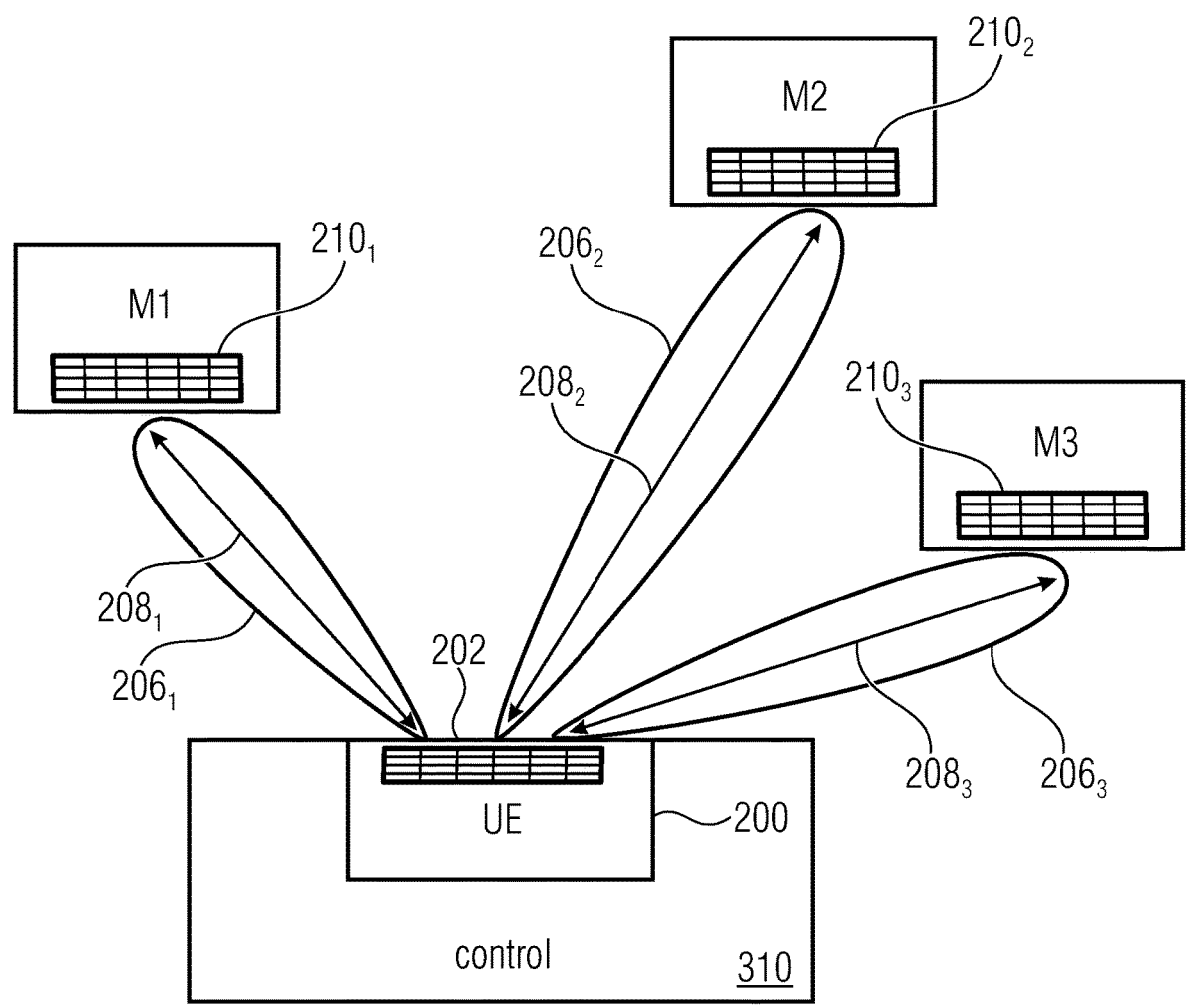
FIG. 7 illustrates another embodiment in accordance with which the inventive user device is coupled to or is part of a machine control.

FIG. 7 illustrates another embodiment in accordance with which the inventive user device 200 is coupled to or is part of a machine control 310, for example within a factory including a plurality of machines M1, M2 and M3. The inventive user device 200, by means of its antennas 202, provides for a multi-connectivity by establishing three wireless communication links $208_1$ to $208_3$ to the respective machines M1 to M3 having coupled thereto or incorporated therein respective wireless network elements $210_1$ to $210_3$. The respective wireless links 208 are formed using the independent spatial/directional beams $206_1$, $206_2$ and $206_3$ generated by the antennas or antenna array 202 of the user device 200. The machine control 310 may transmit/receive signals to the respective machines for monitoring the operation of the machines and for controlling operation of the machines via the independent links. The machines may be any kind of machines, including robots and the like.

Figure 8A:
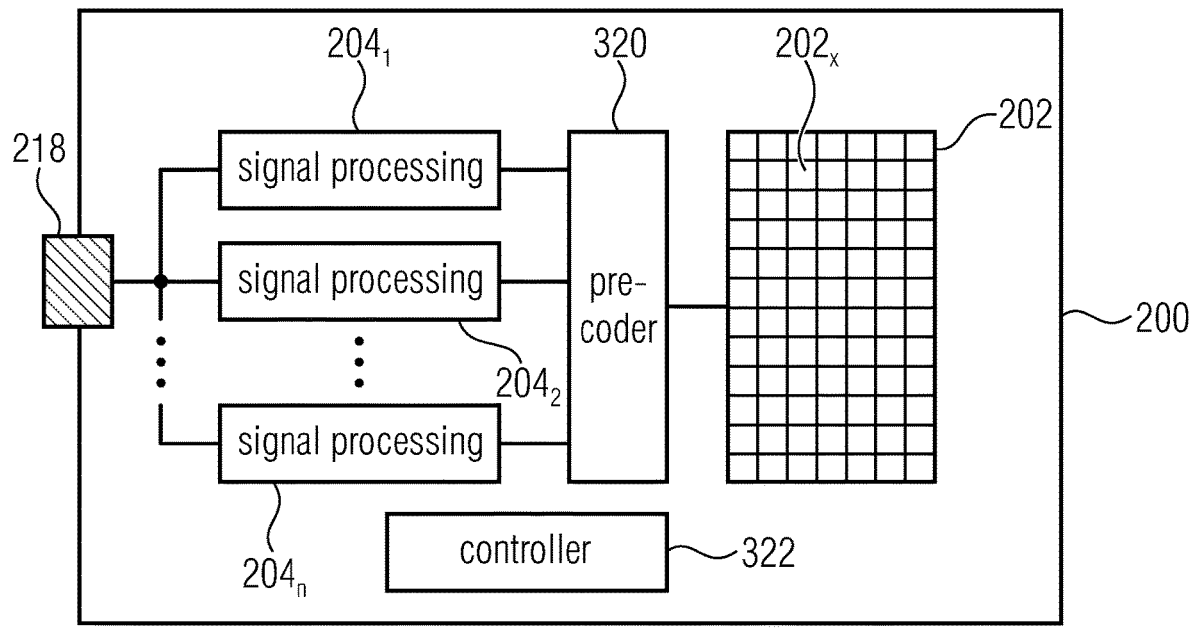
FIG. 8a illustrates a block diagram of the inventive user device in accordance with an embodiment.

FIG. 8a illustrates a block diagram of the inventive user device in accordance with an embodiment. The UE 200 includes an antenna array 202 having a plurality of antennas or antenna elements $202_x$. In accordance with other embodiments, a plurality of such antenna arrays 202 may be provided in the UE 200. The antenna array 202 is coupled to pre-coder 320. The pre-coder 320 may include a codebook or may be coupled to a codebook for forming at least two spatially separated electromagnetic transmit/receive beams for the respective separate, independent wireless communication links. Further, the UE 200 includes one or more signal processors defining respective signal processing chains $204_1$ to $204_n$ coupled to the pre-coder and also coupled to the interface 218 for inputting/outputting signals. In accordance with embodiments, the antenna array 202 may be a massive MIMO antenna array having a high number of antenna elements. As described above, a single signal processor or a plurality of signal processors may be provided for implementing the plurality of signal processing chains $204_4$ to $204_n$, for example a signal processing chain for each of the wireless communication links. The signal processing chain may support per link/per base station/per mobile network operator one or more of:

the DL time and frequency synchronization, the handling of neighborhood lists,
    the handling of resource allocation, like for DL/UL or H-ARQ,
    the UL timing advance, TA,
    the power control,
    trigger and handle of handover procedures.

In the following, embodiments of the inventive approach dealing with the communication over the plurality of wireless communication links will be described.

Physical Layer Retransmission Mechanisms

In accordance with embodiments, the system as depicted in any one of FIG. 2 to FIG. 7 may implement a physical layer retransmission mechanism, like H-ARQ, which includes an indication of suitable links for the retransmission. For example, a physical layer retransmission mechanism, such as H-ARQ, may be applied at the multi-link UE 200 and at the respective wireless network elements, like the base stations BSs, to improve the spectral efficiency. When a destination, like the base station, is not able to decode a message, it may send a non-acknowledgement, NACK, message to request a retransmission from the multi-link UE 200. The destination may indicate which of the multiple links is the advantageous link for the retransmission. The information about the link quality/reliability may be shared by the base stations, for example via the X2 interface or any other backhaul connection, in case the respective base stations coupled to the UE via the different independent wireless links are aware of each other. The link quality/reliability may be found by analyzing the likelihood ratios of the coded information with respect to each link, and a link having a quality/reliability exceeding a predefined threshold may be selected for the retransmission.

Handover

In accordance with embodiments, the system as depicted in any one of FIG. 2 to FIG. 7 may trigger, request and execute for each wireless transmission link 208 an independent hand-over procedure to another wireless network element, like another anchor point in the network or a base station. For example, advanced and delayed triggering of the handovers may implement a "crawling" through the network while keeping at the same time as many of the links 208 as possible in connected mode, for example as many links needed to satisfy a specific target data rate, latency, redundancy or the like.

In accordance with other embodiments, neighborhood lists, like extended neighborhood lists, that may be loaded from the network or from the internet, may be used to enable the ML-UE 200 to connect beyond the range specified in conventional neighborhood lists for simultaneous links across two or more tiers of wireless network elements, different mobile network operators, different radio access technologies and the like.

In accordance with yet further embodiments, the system may perform an anticipatory handover and/or a new link establishment on the basis of knowledge about a predefined route of the use device and/or knowledge about wireless communication links to the wireless network elements that will become available.

In accordance with further embodiments, the handover may be a conventional handover from one BS to a neighboring BS from the announced neighborhood list, or a handover based on establishing a new link to another wireless network element not announced in the neighborhood list using conventional link connection/establishment procedures, like RACH, and providing the end-to-end connection via the new link.

Exploiting Downlink, Dl, Signaling

In accordance with embodiments, the inventive UE 200 may exploit a downlink, DL, signaling from the different wireless network elements, like the different base stations, to differentiate between the two or more wireless network elements, to independently synchronize with the elements, and to provide a parallel decoding/processing/handling of the DL controlled channels. In other words, the DL signaling may come from different bases stations/access points and the UE may be able to differentiate between the two or more base station signals to synchronize the communication for a parallel decoding/processing of the downlink control channels. Thus, the UE 200, implemented in accordance with the teachings described herein, keeps multiple links at the same active or ready to be activated, for example over an extended period of time, like over several radio frames.

Increased Diversity

In accordance with embodiments, the inventive approach increases in diversity, like an increase in code diversity, spatial diversity, time diversity or frequency diversity. To increase the diversity, the UE 200 may transmit and/or receive a message over a plurality of the wireless communication links, for example at the same time over a first wireless communication link and a second wireless communication link. In accordance with yet other embodiments, the message may be split, and the parts of the message may be sent over the first and second wireless communication links at the same time in multiplex.

When transmitting/receiving a message or parts of a message over a plurality of the wireless communication links at the same time, there may be situations in which a communication over one of the wireless communication links may not be successfully decoded or received. In such a situation, a retransmission for the message or a part of the message may be used, and the UE may transmit or request a retransmission message, like a H-ARQ retransmission message, over one or more of the different wireless communication links. In accordance with embodiments, the retransmission message may include redundancy for the data in the message or in the part of the message, wherein the redundancy may include chase combining or incremental redundancy. In accordance with yet other embodiments, a complete retransmission of the entire message or the entire part of the message may be initiated responsive to the request for a retransmission.

In case the respective network elements, like the base stations, are not aware of the existing independent, parallel wireless communication links from the UE to the network, the retransmission may be controlled by an over the top entity which may also control the flow of data through the respective network elements to the UE via the different links, i.e., the retransmission may be handled over the top outside of the actual network elements, for example by a service provider as described above with reference to FIG. 4 and FIG. 5. In case the wireless network elements, like the base stations, or the entities coupled thereto, are aware of the different wireless communication links, the retransmission message may be coordinately transmitted over the different wireless communication links under control of the respective base stations. In such a situation, the retransmission may exploit the two or more links as multiplexing or redundancy links.

Thus, in accordance with the just described embodiments, an original message may be transmitted in a multiplex mode, but repetitions, like those used for H-ARQ, may use a selected, different path or a different diversity over the available paths, spatial/directional streams, and/or frequencies.

Increased Code Diversity

In accordance with embodiments, an increased code diversity is provided by the inventive idea in that the UE 200 forms N, N>1, spatial or directional beams for N different wireless communication links. A message to be transmitted or a part of a message to be transmitted may be encoded, and N copies of the codeword are generated and transmitted over the N different wireless communication links. In accordance with another embodiment, the message or the part of the message may be encoded and the obtained codeword may be split into N subcodewords which, in turn, are transmitted over the N different wireless communication links.

In such a scenario, the respective wireless network elements, like the base stations, may collect the parts of the message and perform a joint processing of the parts of the message which may include the exchange of data via the backhaul interface. This is possible, in situations in which the respective wireless network elements are aware of the plurality of independent wireless communication links provided from the UE to the different base stations. In case the respective network elements are not aware of the independent links, in accordance with other embodiments, the wireless network elements will forward the parts of the message to one or more entities connected thereto which will then collect the parts of the message and perform a joint or distributed processing of the parts of the message. In other words, the final combination of the codeword parts or pieces may be done over the top somewhere in a network entity or at a service level where the service is anchored/hosted.

In accordance with embodiments, the distribution of the respective parts of the message of the multiple links is such that even when all parts are received, the actual content may not be retrieved, rather, additional processing, like network coding, is needed. The respective parts of the messages/data flows may be processed/decoded in a distributed fashion in a first step/stage and after that, in a second stage/step further processing is performed by a joint processing combining the parts from the first stage. For example, at the respective base stations or network elements, soft bits may be generated indicating the probability that a specific bit has a certain value, and these soft bits may be distributed to a shared entity which, on the basis of the received soft bits may generate hard bits, defining the final value of the bit. For example, when receiving for the same parts of the message different soft bits over different links or from different network elements, the shared entity generating the hard bits may select those soft bits having the highest probability for a certain value.

In accordance with further embodiments, the user device may encrypt the message.

Increased Spatial/Time Diversity

In accordance with embodiments, the spatial and time diversity may be increased by sending multiple copies of the data packet or message over multiple links. The UE 200 may copy a message or some part of the message to be transmitted, and then transmit the message and the copy and the other part of the message of the first and second wireless communication links. For example, the multi-link UE 200 may generate N copies of the same message or data packet and apply a channel coding scheme and interleaver pattern, either the same scheme/pattern or different schemes/patterns, to each copy of the message or data packet. The N codewords obtained after channel coding are sent over the N different wireless communication links 208 to the destination in parallel, which may be one or more of the base stations. At the destination, the received information is exchanged by the base stations, provided they have knowledge about the multiple independent links, for example over the X2 interface, and are jointly processed. The joint channel decoder may exploit the correlation of the multiple copies of the message during the decoding process. By accumulating sufficient information of the data from the multiple links, the destination is able to decode the message. In case the message cannot be decoded, the destination may send a NACK to the multi-link UE to request a retransmission of the message. The destination may also indicate the advantageous link for the retransmission to the multi-link UE. At each re-transmission the multi-link UE may optionally encode and interleave the message by a different channel encoding scheme and interleaver pattern, respectively.

In accordance with examples, to keep the channel coding scheme simple, a doped accumulator code with a simple generator may be used, and such a code does not introduce redundancy and the corresponding channel decoder involves only moderate complexity. In accordance with further embodiments, a fountain code may be used which may lead to a transmission scheme which transmits as many parts of the total message until a sufficient number of parts arrived at the destination, like the receiver or decoder, for successfully decoding the message. In such a scenario, a feedback, similar to H-ARQ, may terminate further transmission of the packets.

UL/DL Scheduling

In accordance with embodiments, the inventive UE 200 may control or orchestrate the uplink, UL, and/or downlink, DL, and/or may control or orchestrate a link adaption in an uplink communication and/or a downlink communication. In accordance with embodiments, the UE 200 may have access to a link control in one or more of the wireless network elements, for example to a link control in a base station as shown in the above figures, to directly control the scheduling of resources for the uplink/downlink over the respective wireless communication links. In accordance with other examples, no direct access to the link control may be available, however, an indirect control of the scheduling may be implemented by controlling the transmission of information for the link control in the respective base station such that a certain situation is avoided, for example a simultaneous hand-over for two wireless communication links at the same time.

In accordance with further embodiments, the UE may control/orchestrate the resources and link adaption in the uplink/downlink to provide a dedicated set of resources, like physical resource blocks, that the UE itself may choose, and for such PRBs, the UE may choose a modulation, a coding and a codeword-distribution over the respective wireless communication links. This approach is beneficial in downlink, where the UE is the receiver and observes the channel conditions including interference levels and usually reports to the base stations some indicators, like PMI, CQI and the like, to request specific loading/use of resources. The base station decides and the UE reports another round of feedback if such values led to successful transmissions.

In accordance with further embodiments regarding the uplink/downlink scheduling, the ML-UE 200 in accordance with the inventive approach may employ an antenna array, like a Massive MIMO array, to transmit/receive as many directional/spatial beams, also referred to as streams, as possible on a common resource by spatial multiplexing. The common resource may include a common time/frequency resource. While conventional approaches, like the LTE standard, perform for uplink/downlink scheduling only at the base stations, in accordance with the inventive approach, situations may be handled in which there is no sufficient backhaul or no backhaul at all between the different base stations, as it is the case when connecting to base stations of different mobile network operators. In such a case, the base stations do not know how to provide for an acceptable ML-UE-centric scheduling decision and the corresponding rate allocation or link adaption. This is because there is no global CSI available at the base stations, each of which only has its local CSI. For the uplink, there are difficulties or uncertainties in scheduling in the sense that each BS does not know how much its own uplink streams interfere with other co-scheduled base stations for a certain ML-UE. In such a scenario, in accordance with embodiments, the uplink scheduling may be performed at the UE side because, otherwise, such uplink interference is most likely to significantly degrade the uplink throughput of the ML-UE.

For example, the UE may request the same uplink/downlink resource blocks, also referred to as common uplink/downlink resource blocks, to multiple potential base stations, and once the UE gets a grant from some of the base stations the UE may trigger CSI feedback from the base stations that permitted the grant. Given the reported CSI (RI/PMI/CQI), the UE schedules the best set of beam forming matrices provided by the precoder. The UE may then also perform the link adaption by signaling UL/DL control information to the base stations. In other words, in accordance with such embodiments, the inventive ML-UE 200 may perform the same role as a base station in a conventional massive MIMO system.

Independent Power Control

In accordance with yet further embodiments, the user device 200 may provide for an independent management of the wireless communication links, for example, for an independent link feedback including CSI, CQI, PMI and H-ARQ hand-overs and the like.

Aggregation Node

In accordance with embodiments of the present invention, as also shortly mentioned above, the UE 200 may operate as an aggregation node for a plurality of further devices connected to the aggregation node.

For example, the inventive UE 200 may be an aggregation node for a moving hotspot, like on a bus, a train or an airplane, and several devices located in the vehicle may be connected to the aggregation node. The connected devices may forward their own ID, specific properties and the like to the spatial link IDs and vice versa. The multi-link connectivity may be to different MNOs' networks and devices at the other end may be grouped per MNO. The devices may obtain a "transcoded" link anchored in any one of the networks, for example by multi-MNO anchoring of services.

Multiplexing of Analog Beamforming Components

In accordance with further embodiments, the user device may include a modulator/demodulator, that is implemented, for example, in the signal processor shown in FIG. 8a for the respective signaling chains 204. The antenna array may comprise a massive MIMO antenna array 202, and all or a group of the antenna elements $202_x$ within the antenna array 202 may receive/transmit the same RF signal from/to the modulator/demodulator. When referring to the RF signal, an analog signal coming from the modulator is meant, which may be a base band signal in the analog domain after DAC or may be mixed up to an intermediate frequency. The beamforming is than performed by, for example, phase shifters or mixing with a fixed phase delay in parallel stages in order to create an analog beamforming, so that not every antenna element has its own transceiver chain. In order words, in case of analog beamforming or hybrid beamforming, respectively, all antennas within the antenna array 202, or a group of antennas $202_x$ may receive the same RF signal from the modulator. This signal may be phase-shifted by a parameterizable phase individually for each antenna, and using all antennas parameterized with the phase leads to a maximum SINR towards the target receiver and simultaneously minimizes the interference in all other receivers. If a current data rate and an interference rejection requirement, however, is not that high, a smaller number of antennas or groups may be sufficient for the signaling towards the target receiver. The transmitter may be the ML-UE 200, and the receivers may be the base stations or the other network elements, like other UEs, and establishing the multiple links to the multiple base stations in parallel from the single ML-UE leads to statistical multiplexing gain concerning the beamforming hardware that may be used. For example, for supporting three parallel beams to three base stations, the number of antennas or groups may be significantly lower than three times the hardware for a single link.

Thus, in accordance with further embodiments, a controller, like the controller 322 of FIG. 8a, may be provided to dynamically increase/decrease the number of antennas per wireless communication link, for example according to a current data rate requirement for each wireless communication link, and/or increase/decrease the number of wireless communication links, and/or antenna elements of an antenna array used to create wireless communication links, and/or the number of spatial beams per wireless communication link.

Figure 8B:
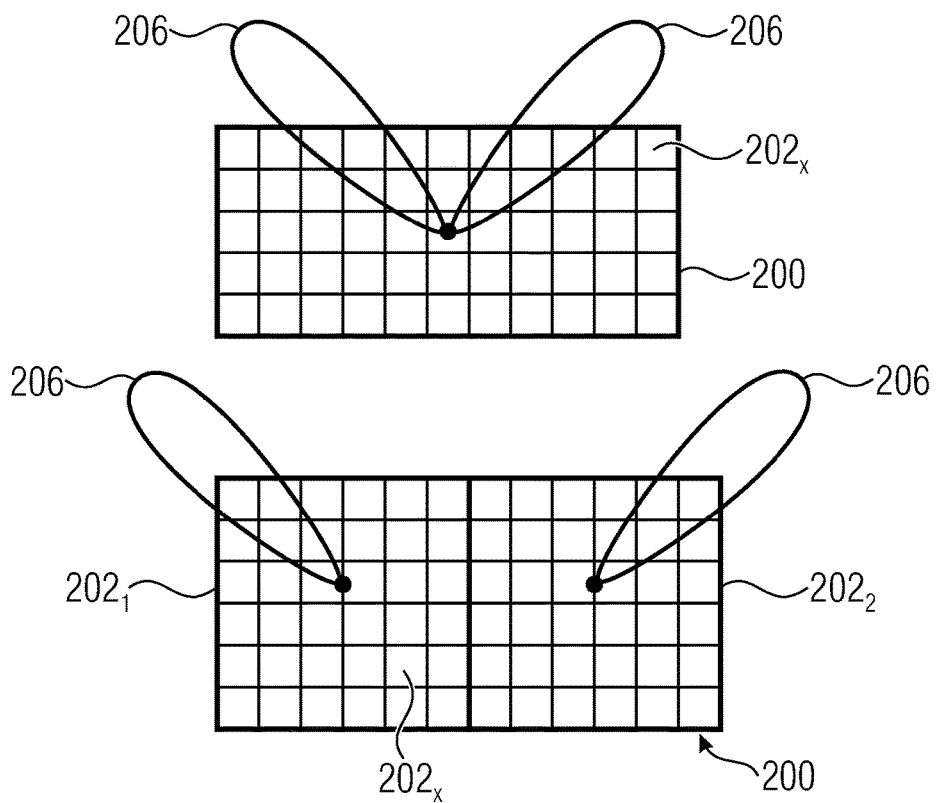
FIG. 8b illustrates embodiments for implementing the one or more antenna arrays of the inventive user device.

FIG. 8b illustrates embodiments for implementing the one or more antenna arrays of the inventive user device. The one or more antenna arrays may include a plurality of antenna elements $202_x$, e.g., 8×8 to several hundreds, operating in the mm-Waveband. In accordance with a first embodiment, the array 200 may be controlled to form the plurality of beams 206 using all antenna elements $202_x$. In accordance with a second embodiment, the array may be controlled such that a plurality of subarrays $202_1$, $202_2$ are used for forming the respective beams 206.

Protocols about the Link Conditions

In accordance with further embodiments, the inventive approach may include obtaining information about a condition of the one or more wireless communications links, either at a network level, for example by performing appropriate measurements by the respective network elements, like the base stations, or by measurements performed at the UE 200 to obtain respective parameters, like KPIs, associated with the wireless communication links or by monitoring the behavior of the communication, for example the number of requested retransmissions giving some information about the communication behavior, namely how good a communication link is for transmitting specific data. The information about the condition of the one or more channels may be transmitted or distributed among the respective entities of the entire system, for example once the measurement has been completed, upon a specific request issued or at specific times or intervals. For example, in accordance with embodiments, the obtained information may be used to dynamically adapt the communication over the different wireless communication links, for example responsive to the information received from the user device or from any other of the entities.

E2E Multi-Link Orchestration

In accordance with further embodiments, the inventive approach may provide for the E2E multi-link orchestration.

The E2E multi-link orchestration includes, in accordance with an embodiment, the orchestration of the link ID and user ID, that may be used for the access to the network and for services.

Figure 9:
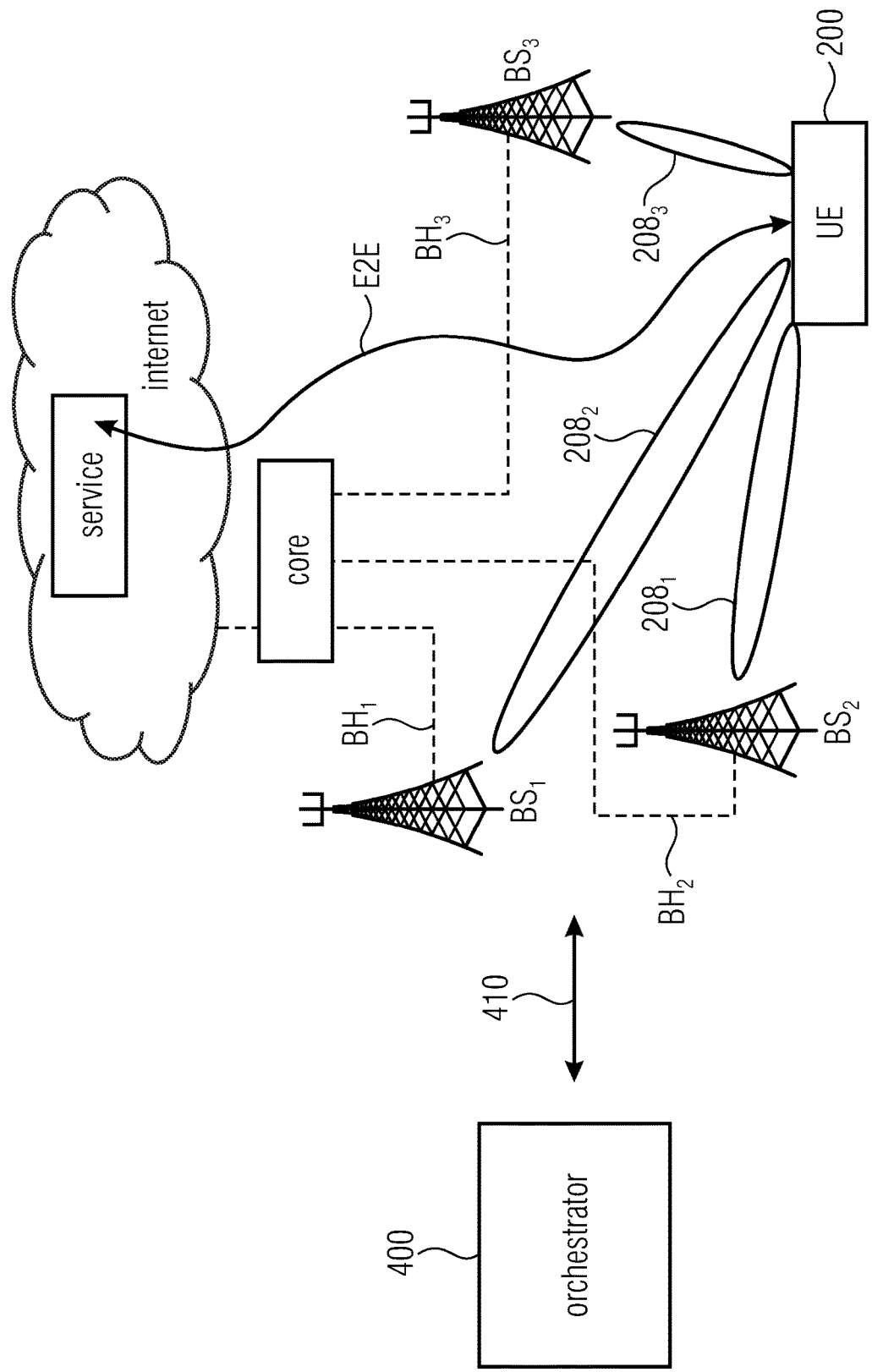
FIG. 9 a schematic representation of a network including an orchestrator according to embodiments of the invention.

FIG. 9 is a schematic representation of a network including an orchestrator according to embodiments of the invention. The inventive UE 200 provides three independent links $208_1$ to $208_3$ via respective bases stations $BS_1$ to $BS_3$ to a service located, e.g., in the internet or at any other location in the depicted environment. In FIG. 9 the logical connection between the UE and the service is represented by the arrow E2E. The base stations are connected to the service by their respective backhaul connections $BH_1$ to $BH_3$. The orchestrator 400 may be a multi-link orchestrator or a multi-ID orchestrator or both. The multi-link orchestrator and the a multi-ID orchestrator may implemented in the same or separate entities in a centralized or distributed manner. The orchestrator may be an entity behind the actual network, like a server in the internet, may be at the UE to provide a UE centric multi-connection or multi-link orchestration, or may be at one or more of the network elements, like the above mentioned base stations, to provide a network centric multi-connection orchestration.

The multi-link orchestrator controls the transmissions or data flows for the E2E connectivity via the links 208 and the backhaul connections BH. The multi-link orchestrator may exploit knowledge, as schematically represented at 410, about the conditions of the links 208 and the backhaul connections BH, described e.g., by KPIs (key performance indicators), like data rate, interference level, congestion, load, etc., in order to utilize the combined links for the E2E connectivity according to certain criteria for the E2E communication, like reliability, latency data rate and others. Such knowledge may be provided by the service or the network, like the network elements, any entities in the network or the UE 200. The multi-link orchestrator may interact also with entities of the core network, like EPC, evolved packet core, functions in 4G networks.

The multi-link orchestrator may control, e.g. via control signaling, link performance relevant parameters directly at the network elements or at link associated entities, e.g. a scheduler, a link controller, a handover controller etc., or indirectly on the basis of service or link specific parameters, like, guaranteed bit rate service, ULLRC, etc.

In accordance with embodiments, a UE centric multi-link orchestrator may control the links that may be used for critical services, like URLLC, by coordinating/orchestrating base station schedulers, by data route/flow selection or prioritization, especially for the UL using grant free access procedures. Furthermore, the UE and/or the service may trigger end-to-end link performance tests on demand or in predefined intervals, like response times, retransmission attempts, etc.

For example, latency-critical data may be routed by the UE 200 over the fastest link, e.g., the link for which the resource blocks RBs that may be used, are available and/or for which the least number of H-ARQ retransmissions are expected, and/or the lowest end-to-end latency is expected. Further, latency-critical data may be split and transmitted over the links. The scheduling of the scheduling preference decision may made at the UE, and may be appropriately communicated to the involved network elements, like the base stations.

The multi-ID orchestrator controls the different IDs, like subscriber identifications, of the wireless communication links 208 used for an access to the one or more wireless networks. The IDs may be used to authenticate the user device and to authorize access to the network and/or to specific network capabilities, like network slices, services, and KPI report requests. The different IDs may be combined into a common multi-link UE ID. Such multi-link UE IDs may be handled more efficiently in the one or more networks.

Advantages

The inventive approach described above in detail, provides for a number of advantages over known approaches. In accordance with the teachings described herein, an aggregation of links to several network elements, like base stations, at the same time is enabled so that the data rate is increased by spatial or frequency multiplexing to the several base stations, so that a link diversity is provided for an improved link stability and a reduced outage as well as for a load balancing of backhaul connections among several base stations. Further, a significant inter-cell interference reduction at the UE side is achieved, and an energy reduced multi-link transmission between the networks and the ML-UE 200 is available.

Further, embodiments of the inventive approach are advantageous as they may provide multi-handovers at the same time and/or at different time instances to reduce the number of handover failures, balance the traffic handovers, reduce latency and improve support of continuation, especially in mobile edge computing MEC. Further advantages of the inventive approach are improvements in the E2E service delivery as multi-path routing of packets of several work elements, like base stations in the same or different networks using the same or different radio access technologies are enabled, and further embodiments are advantageous as statistical multiplexing is provided on backhaul over several base stations thereby reducing fluctuations in effective data rate, delay, chitter, for example in cases when a handover occurs.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 900. The units or modules as well as the steps of the methods performed by these units may execute on one or more computer systems 900. The computer system 900 includes one or more processors 902, like a special purpose or a general purpose digital signal processor. The processor 902 is connected to a communication infrastructure 904, like a bus or a network. The computer system 900 includes a main memory 906, e.g., a random access memory (RAM), and a secondary memory 908, e.g., a hard disk drive and/or a removable storage drive. The secondary memory 908 may allow computer programs or other instructions to be loaded into the computer system 900. The computer system 900 may further include a communications interface 9010 to allow software and data to be transferred between computer system 900 and external devices. The communication may be in the form electronic, electromagnetic, optical, or other signals capable of being handled by a communications interface. The communication may use a wire or a cable, fiber optics, a phone line, a cellular phone link, an RF link and other communications channels 912.

The terms "computer program medium" and "computer readable medium" are used to generally refer to tangible storage media such as removable storage units or a hard disk installed in a hard disk drive. These computer program products are means for providing software to the computer system 900. The computer programs, also referred to as computer control logic, are stored in main memory 906 and/or secondary memory 908. Computer programs may also be received via the communications interface 910. The computer program, when executed, enable the computer system 900 to implement the present invention. In particular, the computer program, when executed, enable processor 902 to implement the processes of the present invention, such as any of the methods described herein. Accordingly, such a computer program may represent a controller of the computer system 900. Where the disclosure is implemented using software, the software may be stored in a computer program product and loaded into computer system 900 using a removable storage drive, an interface, like communications interface 910.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device for a wireless communication with a plurality of wireless network elements, the user device comprising:
    a plurality of antennas, the plurality of antennas configured to form a plurality of spatial or directional beams, wherein the user device is configured to provide simultaneously a plurality of independent wireless communication links using the plurality of spatial or directional beams, wherein the user device is configured to provide a first wireless communication link with a first wireless network element using a first spatial or directional beam and to provide a second wireless communication link with a second wireless network element using a second spatial or directional beam.

2. The user device according to claim 1, wherein the wireless network elements are part of one or more wireless communication networks, and the one or more wireless communication networks comprise: (a) wireless communication networks operated by the same MNOs, or (b) wireless communication networks operated by different MNOs, or (c) wireless communication networks comprising the same RAT, or (d) wireless communication networks comprising different RATs, or (e) combinations of (a), (b), (c) and/or (d), the RAT may be one or more of: 3G, 4G LTE/LTE-A/LTE-A Pro, 5G/NR, LTE V2X comprising V2V/V2I/V2P, enhanced V2X, eV2X of 5G/NR, IEEE 802.11, IEEE 802.11p DSRC or other technologies such as Bluetooth, WiFi variants to include IEEE 802.11 ad, IEEE 802.11 ay, IEEE 802.11 ac and ETSI DECT variants.

3. The user device according to claim 1, wherein the wireless network elements operate using the same or different network resources provided by one or more wireless communication networks, the same or different frequencies or the same or different frequency bands or parts of a frequency band.

4. The user device according to claim 1, wherein
    the plurality of antenna is configured to simultaneously form the plurality of spatial or directional beams at the same or at different frequencies to allow for a parallel transmission over a plurality of wireless communication links.

5. The user device according to claim 1, wherein
    the user device is configured to handle the connection to a first wireless network element via the first wireless communication link independent of the connection to a second wireless network element via the second wireless communication link to keep the wireless communication links at the same time active or ready to be activated over an elongated period of time, e.g. over several radio frames.

6. The user device according to claim 1, wherein
    the user device is configured to receive control information from or via one or more wireless network elements for coordinating data transmissions over the first and second wireless communication links.

7. The user device according to claim 1, comprising: one or more of: electronics, software, sensors, actuators, and network connectivity configured to enable the user device to scan/search for, detect, initiate, establish, discontinue/terminate, handover, maintain or monitor a connection to the wireless network elements via the respective wireless communication links, e.g., to exchange data and/or to follow or track control channels.

8. The user device according to claim 1, wherein the user device is a stationary device or a mobile device, the mobile device may comprise a handheld device, to include a smartphone, a PDA, IoT device, a computer, a ground based vehicle, such as robots or cars, or an aerial vehicle, such as manned or unmanned aerial vehicles UAVs, the latter also referred to as drones, and the stationary device may be comprised by or attached to a physical device, a building or any item comprising embedded therein network connectivity to enable the device to scan/search for, detect, initiate, establish, discontinue/terminate, maintain or monitor a connection to the wireless network elements via the respective wireless communication links.

9. The user device according to claim 1, wherein
the wireless network elements comprise one or more base stations BS and/or one or more link forwarding elements, e.g., a relaying device, for one or more further user devices.

10. The user device according to claim 1, wherein
the user device is configured to communicate with a certain destination, wherein the destination may be one or more of the wireless network elements or one or more entities coupled to one or more of the wireless network elements.

11. The user device according to claim 10, wherein the one or more entities may comprise one or more of: a service provider providing a certain service, to include URLLC services for remote machine operation or closed loop control, and a mobile or stationary device, to include a machine, a vehicle or a robot, coupled to or comprising a wireless network element, e.g., for providing a machine-to-machine M2M, V2V, V2X communication.

12. The user device according to claim 1, comprising
at least one antenna array, the antenna array comprising the plurality of antennas,
a precoder connected to the antenna array, the precoder configured to form by the antenna array the plurality of spatial or directional beams, and
a plurality of signal processing chains for the plurality of wireless communication links.

13. The user device according to claim 1, wherein the user device is configured to exploit a downlink, DL, signaling from the first and second wireless network elements to differentiate between the two or more wireless network elements and to synchronize and decode/process/handle the DL control channels in parallel and/or independently.

14. The user device according to claim 1, wherein the user device is configured to
transmit and/or receive a message over both the first wireless communication link and the second wireless communication link, and/or
split a message or duplicate a message or create a redundancy version of a message, and to transmit the parts of the message over the first and second wireless communication links at the same time in multiplex,
wherein the message may be of the type data message PUSCH or control message PUCCH.

15. The user device according to 14, wherein, in case a retransmission for the message may be used, the user device is configured to transmit or request a retransmission message, to include a H-ARQ retransmission message, over one or more of the different wireless communication links, the retransmission message comprising redundancy for data in the message, the redundancy comprising, e.g., chase combining or incremental redundancy.

16. The user device according to claim 15, wherein, in case the wireless network elements or entities coupled to the wireless network elements are aware of the different wireless communication links, the retransmission message is coordinately transmitted over the different wireless communication links under control of the wireless network elements.

17. The user device according to claim 14, wherein the user device is configured
to form N, N>1, spatial or directional beams for N different wireless communication links, and
to encode the message, generate N redundancy versions or duplicates of the codeword, and to transmit the codewords over the N different wireless communication links, and/or
to encode the message, to split a codeword for the message into N subcodewords, and to transmit N subcodewords over the N different wireless communication links.

18. The user device according to claim 14,
wherein the wireless network elements are configured to collect the parts of the message, and to perform a joint processing of the parts of the message, the joint processing comprising a data exchange via a backhaul interface, or
wherein the wireless network elements are configured to forward the parts of the message to one or more entities connected to the one or more wireless communication networks, the one or more entities for collecting the parts of the message and performing a joint or distributed processing of the parts of the message.

19. The user device according to claim 14, wherein a part of the message does not allow retrieval of a content of the message.

20. The user device according to claim 14, wherein a content of the message is retrievable once a certain number of parts or all parts of the message are received.

21. The user device according to claim 14, wherein the user device is configured to encrypt the message.

22. The user device according to claim 14, wherein the user device is configured to copy a message or some part of a message or a redundancy version of the message to be transmitted, and to transmit the message and the copy/redundancy version of the message and the other part of the message over the first and second wireless communication link.

23. The user device according to claim 22, wherein the user device is configured
to form N, N>1, spatial or directional beams for N different wireless communication links,
to generate N redundancy versions, which can be copies, of the message, and to transmit the N redundancy versions over the N different wireless communication links.

24. The user device according to claim 22, wherein the user device is configured to apply different coding schemes and/or interleaver patterns to each copy of the message, and to transmit the N codewords acquired after channel encoding over the N different wireless communication links.

25. The user device according to claim 22, wherein the wireless network elements are configured to exchange and jointly process, de-interleave and decode the received copies of the message.

26. The user device according to claim 1, wherein the user device is configured to control or orchestrate uplink, UL, and/or downlink resources, and/or control or orchestrate a link adaptation in an uplink communication and/or a downlink communication.

27. The user device according to claim 26, wherein, for the user device is configured to access a link control in one or more of the wireless network elements, and/or control the transmission of any information for the link control in one or more of the wireless network elements such that a certain situation is avoided, to include a simultaneous handover for two wireless communication links.

28. The user device according to claim 1, wherein the user device is configured to choose, for a dedicated set of resources, to include PRBs, a modulation, a coding, and a codeword-distribution over the wireless communication links.

29. The user device according to claim 1, wherein the user device is configured to request common UL/DL resource blocks from a plurality of the wireless network elements, responsive to the grant from some of the wireless network elements, to trigger a CSI feedback from the wireless network elements that permitted grant, using the reported CSI, to include RI/PMI/CQI/PT, to schedule a set of beamforming matrices and wireless network elements according to a certain performance metric.

30. The user device according to claim 1, wherein the user device is configured to provide for an independent management of the wireless communication links, e.g., link feedback comprising CSI, CQI, PMI, and H-ARQ, or handovers.

31. The user device according to claim 1, comprising: a plurality of signal processing chains for the plurality of wireless communication links, wherein the plurality of signal processing chains may be configured to support per wireless communication link one of more of: the DL time and frequency synchronization, the handling of neighborhood lists, the handling of the resource allocation, to include for DL/UL or H-ARQ, the UL timing advance, TA, the power control, trigger and handle handover procedures.

32. The user device according to claim 1, wherein the user device is configured to operate as an aggregation node for a plurality of further devices connected to the aggregation node.

33. The user device according to claim 1, comprising
a modulator/demodulator,
wherein the antenna array comprises at least one massive MIMO antenna array, and
wherein the user device is configured such that all or a group of the antennas within the massive MIMO antennas array receive/transmit the same RF signal from/to the modulator/demodulator.

34. The user device according to claim 1, comprising
a controller, the controller configured to dynamically increase/decrease
the number of antennas per wireless communication link, e.g., according a current data rate requirement for each wireless communication link, and/or
the number of wireless communication links, and/or
the number of antenna elements of an antenna array used to create a wireless communication link, and/or
the number of spatial beams per wireless communication link.

35. The user device according to claim 1, wherein the user device is configured to acquire information about a condition of the one or more wireless communication links, e.g., by measuring one or more parameters associated with the wireless communication links or monitoring a communication behavior, to include the number of retransmission requests, and transmit the information, e.g., in accordance with a schedule at predefined times or intervals, once a measurement has been completed, upon a request received at the user device.

36. The user device according to claim 35, wherein the wireless network elements, responsive to the information from the user device, dynamically adapt the communication over the different wireless communication links.

37. The user device according to claim 1, wherein the wireless network elements comprise one or more user devices according to claim 1.

38. The user device according to claim 1, wherein forming the spatial or directional beams comprises one or more of the following:
Analogue and/or digital beamforming,
Space time block codes STBC,
Space frequency block codes SFBC,
Cyclic delay diversity CDD,
Multiplexing,
Precoding using CSI or transmit precoding matrices.

39. The user device according to claim 1, wherein the plurality of antennas comprises one or more of: —one or more antenna arrays, each comprising a plurality of antenna elements, —steerable antennas comprising fixed or adjustable beam patterns, e.g. gimbaled antennas, to include horn antennas, controllable to be directed towards the respective network element associated with the respective wireless communication link.

40. A system, comprising:
one or more wireless communication networks, each wireless communication network comprising one or more wireless network elements; and
one or more user devices according to claim 1, the user device for wireless communication with a plurality of wireless network elements of the one or more wireless communication networks.

41. The system according to claim 40, wherein
only the user device comprises an antenna array comprising the plurality of antennas, and the wireless network elements comprise sector antennas or omnidirectional antennas, or
the user device and the wireless network elements comprise antenna arrays to allow creating a multi-point-to-multi-point, MP2MP, connectivity between the wireless network elements and the user device, or
the user device and the wireless network elements comprise antenna arrays to employ a high-order spatial multiplexing scheme for implementing between the user device and at least one of the wireless network elements a large number of parallel spatial layers for a high data rate over the wireless communication link between the user device and the wireless network element.

42. The system according to claim 40, wherein traffic over the wireless communication links, to include end-to-end, E2E, traffic, may be orchestrated at the network side, at the user device, by a service, or a combination thereof, wherein the service may be located inside or outside the network or the user device.

43. The system according to claim 40, comprising a physical layer retransmission mechanism, to include H-ARQ, comprising an indication of suitable wireless communication link for a retransmission.

44. The system according to claim 40, wherein the system is configured to trigger, request, and execute for each wireless transmission link an independent hand-over procedure to another wireless network element.

45. The system according to claim 40, wherein the system is configured perform an anticipatory handover and/or a new link establishment using knowledge about a predefined route of the user device and/or knowledge about available and anticipated wireless communication links to wireless network elements.

46. The system according to claim 40, wherein the system is configured to keep as many wireless transmission links in a connected mode as needed to satisfy a specific target data rate, latency, redundancy, or reliability.

47. The system according to claim 40, wherein the system is configured to operate using an extended neighborhood list, that may be provided by the network or by the internet, to enable the user device to connect beyond the range specified in classical neighborhood lists, to allow, e.g., for simultaneous links across two or more tiers of wireless network elements, different MNOs, different RAT etc.

48. A method for a wireless communication of a user device with a plurality of wireless network elements, the method comprising forming, at the user device, a plurality of spatial or directional beams, providing simultaneously a plurality of independent wireless communication links using the plurality of spatial or directional beams, wherein a first wireless communication link is provided between the user device and a first wireless network element using a first spatial or directional beam, and a second wireless communication link is provided between the user device and a second wireless network elements using a second spatial or directional beam.

49. A non-transitory digital storage medium having a computer program stored thereon to perform the method for a wireless communication of a user device with a plurality of wireless network elements, the method comprising forming, at the user device, a plurality of spatial or directional beams, providing simultaneously a plurality of independent wireless communication links using the plurality of spatial or directional beams, wherein a first wireless communication link is provided between the user device and a first wireless network element using a first spatial or directional beam, and a second wireless communication link is provided between the user device and a second wireless network elements using a second spatial or directional beam, when said computer program is run by a computer.

* * * * *